United States Patent [19]

Ichikawa

[11] Patent Number: 5,410,485
[45] Date of Patent: Apr. 25, 1995

[54] NAVIGATION APPARATUS AND METHOD FOR EXPLORING AN OPTIMAL ROUTE BASED ON CHARACTERISTICS OF AN EXPLORATION OBJECT ZONE

[75] Inventor: Shigeru Ichikawa, Iwaki, Japan

[73] Assignee: Alpine Electronics, Inc., Tokyo, Japan

[21] Appl. No.: 139,595

[22] Filed: Oct. 19, 1993

[30] Foreign Application Priority Data

Oct. 22, 1992 [JP] Japan .................................. 4-284263

[51] Int. Cl.⁶ ............................................ G06F 15/50
[52] U.S. Cl. .................................... 364/444; 364/449; 340/995
[58] Field of Search ............... 364/443, 444, 449, 489; 340/990, 995

[56] References Cited

U.S. PATENT DOCUMENTS

| 5,121,326 | 6/1992 | Moroto et al. | 364/449 |
| 5,168,452 | 12/1992 | Yamada et al. | 364/444 |
| 5,187,667 | 2/1993 | Short | 364/443 |
| 5,272,638 | 12/1993 | Martin et al. | 364/444 |
| 5,285,391 | 2/1994 | Smith, Jr. et al. | 364/443 |

Primary Examiner—Michael Zanelli
Attorney, Agent, or Firm—Guy W. Shoup; Norman R. Klivans; Patrick T. Bever

[57] ABSTRACT

A method and apparatus for reliably determining an optimal route between a departure point and a destination in an exploration object zone, the optimal route being determined according to the situation of roads separating the departure point and the destination. Prior to route exploration, an area determiner counts the total number of intersection network lists associated with a route exploration object zone, which lists are stored in a route exploration memory. When a density of intersections (which is the total number of intersection network lists divided by the size of the route exploration object zone) exceeds a certain value, the area determiner determines that the object zone lies in an urban (high road density) district. When the density of intersections is smaller, the area determiner determines that the object zone lies in a suburban (low road density) district. When the area determiner determines that the object zone lies in an urban district, an optimal route explorer executes heuristic exploration; that is, it uses intersection network lists to explore an optimal route linking a departure point and a destination while trimming away routes that deviate from the direction specified with a straight line joining the departure point and destination or while lowering the priorities of such routes. When the area determiner determines that the object zone lies in a suburban district, the optimal route explorer executes normal non-heuristic (exhaustive) exploration.

20 Claims, 24 Drawing Sheets

FIG. 2

| NO. | CONTENTS |
|---|---|
| 0 | INTERSECTION SEQUENTIAL NUMBER |
| 1 | DRAWING NUMBER |
| 2 | UNIT CODE |
| 3 | ADDRESS OF THE NODE IN THE NODE TABLE |
| 4 | LONGITUDE |
| 5 | LATITUDE |
| 6 | ADDRESS OF THE COMPONENT RECORD IN THE INTERSECTION NODE LIST |
| 7 | NUMBER OF INTERSECTION NODES |
| 8 | ADDRESS OF THE ADJACENT NODE RECORD IN THE ADJACENT NODE LIST |
| 9 | NUMBER OF ADJACENT NODES |
| 10 | INTERSECTION SEQUENTIAL NUMBER OF THE FIRST ADJACENT INTERSECTION |
| 11 | DISTANCE TO THE FIRST ADJACENT INTERSECTION |
| 12 | INTERSECTION SEQUENTIAL NUMBER OF THE SECOND ADJACENT INTERSECTION |
| 13 | DISTANCE TO THE SECOND ADJACENT INTERSECTION |
| ⋮ | ⋮ |
| 23 | INTERSECTION SEQUENTIAL NUMBER OF THE SEVENTH ADJACENT INTERSECTION |
| 24 | DISTANCE TO THE SEVENTH ADJACENT INTERSECTION |
| 25 | INTERSECTION SEQUENTIAL NUMBER IMMEDIATELY BEFORE THE INTERSECTION |
| 26 | TOTAL DISTANCE FROM THE DEPARTURE POINT TO THE INTERSECTION |
| 27 | DEGREE OF RETRIEVAL OF THE INTERSECTION |

CRNL

FIG. 9

| BU11 RN1 | BU12 | BU13 DSP |
|---|---|---|
| BU21 | BU22 | BU23 |
| BU31 STP | BU32 | BU33 RN2 |

× ROUTE TO BE TRIMMED

FIG. 12

| NO. | CONTENTS |
|---|---|
| 0 | INTERSECTION SEQUENTIAL NUMBER |
| 1 | DRAWING NUMBER |
| 2 | UNIT CODE |
| 3 | ADDRESS OF THE NODE IN THE NODE TABLE |
| 4 | LONGITUDE |
| 5 | LATITUDE |
| 6 | ADDRESS OF THE COMPONENT RECORD IN THE INTERSECTION NODE LIST |
| 7 | NUMBER OF INTERSECTION NODES |
| 8 | ADDRESS OF THE ADJACENT NODE RECORD IN THE ADJACENT NODE LIST |
| 9 | NUMBER OF ADJACENT NODES |
| 10 | INTERSECTION SEQUENTIAL NUMBER OF THE FIRST ADJACENT INTERSECTION |
| 11 | DISTANCE TO THE FIRST ADJACENT INTERSECTION |
| 12 | DIFFERENTIAL COORDINATES (X,Y) OF THE FIRST ADJACENT INTERSECTION |
| 13 | INTERSECTION SEQUENTIAL NUMBER OF THE SECOND ADJACENT INTERSECTION |
| 14 | DISTANCE TO THE SECOND ADJACENT INTERSECTION |
| 15 | DIFFERENTIAL COORDINATES (X,Y) OF THE SECOND ADJACENT INTERSECTION |
| ⋮ | ⋮ |
| 28 | INTERSECTION SEQUENTIAL NUMBER OF THE SEVENTH ADJACENT INTERSECTION |
| 29 | DISTANCE TO THE SEVENTH ADJACENT INTERSECTION |
| 30 | DIFFERENTIAL COORDINATES (X,Y) OF TH SEVENTH ADJACENT INTERSECTION |
| 31 | INTERSECTION SEQUENTIAL NUMBER IMMEDIATELY BEFORE THE INTERSECTION |
| 32 | TOTAL DISTANCE FROM THE DEPARTURE POINT TO THE INTERSECTION |
| 33 | DEGREE OF RETRIEVAL OF THE INTERSECTION |

CRNL

CPi INTERSECTION
xi LONGITUDE
yi LATITUDE

X-Y DIFFERENCE COORDINATE SYSTEM

A1~A4    DRAWING
AU11~AU44 QUARTER DRAWING

NAVIGATION APPARATUS AND METHOD FOR EXPLORING AN OPTIMAL ROUTE BASED ON CHARACTERISTICS OF AN EXPLORATION OBJECT ZONE

BACKGROUND OF THE INVENTION

1. Field of the Invention

The present invention relates to a route exploration method which searches for the shortest route between a departure point and a destination.

2. Description of Related Art

An on-vehicle navigator includes a large-capacity memory such as a CD ROM that stores a large amount of map data, a display unit, and a vehicle location detector for detecting a current location of a vehicle. The navigator reads map data indicating a current position of a vehicle from the CD ROM, and draws a map based on the map data on a display screen. A vehicle location mark (location cursor) is fixed at a specific position (for example, in the center) on the display screen and a map is scrolled with the movement of the vehicle: alternatively, the map is fixed on the screen and the vehicle location mark is moved, showing where the current vehicle location is.

Each map stored in the CD ROM is segmented into drawings, for each of which longitudinal and latitudinal width are determined appropriately according to a scale. A road or the like is described as a set of coordinates representing vertices (nodes) indicated by the longitudes and latitudes, and the road is drawn by plotting the nodes sequentially using lines; a road joins two or more nodes. Two nodes are joined to form what is referred to as a link. Map data is, as shown in FIG. 19, divided into four data units (quarter drawings) that correspond to four divisions of one drawing. One data unit corresponds to one screen. Map data is composed of (1) a road layer containing a road list, a node table, an intersection node list, and an adjacent node list, (2) a background layer containing data for graphically displaying roads, buildings, rivers, etc. in map screens, and (3) a character layer containing alphanumeric data for displaying municipal names and road names.

The road layer has the structure shown in FIG. 20. In the road list RDLT, data items such as a road type (expressway, national highway, and other roads), the total number of nodes forming a road, addresses of nodes forming a road in a node table NDTB, and distances to adjacent nodes are listed for each road. The intersection node list CRLT is composed of sets of addresses of nodes in the node table NDTB that lie at the other ends of links extending from intersections (referred to as intersection nodes), where the sets of addresses are provided in one-to-one correspondence with the intersections. The adjacent node list NNLT is concerned with an adjacent node that is one of the nodes which form a road and is defined by data scattered over multiple units, and that is defined by data which lies on a boundary of units and is shared among multiple units (See FIGS. 21a, 21b). The adjacent node list NNLT lists the number of adjacent nodes corresponding to the number of units that share a node, a drawing number, a unit code of a unit containing the portion of the data of the drawing that defines the adjacent node, and an address of the unit in the node table.

In FIG. 21(a), an adjacent node RN defined by data in a unit $AU_1$ ($AU_2$) is shared with a unit $AU_2$ ($AU_1$). The number of adjacent nodes is therefore one. In FIG. 21(b), an adjacent node RN defined with data in a unit. $AU_{11}$ is shared with three units $U_{12}$, $AU_{21}$, and $AU_{22}$. The number of adjacent nodes is therefore 3. The node table NDTB lists all nodes in a map, and includes coordinate information (longitudes and latitudes) of all the nodes, an intersection identification (hereinafter, ID) flag indicating if a particular node is an intersection, a pointer that when the node is an intersection, points to its address in the intersection node list, and that when the node is not an intersection, points to an address of a road, to which the node belongs, in the road list, an adjacent node ID flag indicating whether or not the node is an adjacent node, and a pointer that when the node is an adjacent node, points to its address in the adjacent node list NNLT.

The on-vehicle navigator has a route guidance facility that explores an optimal route which joins a departure point and a destination by the shortest distance, and displays a guidance route on a screen to give the driver travel guidance. The guidance route is displayed by a boldface line in a specific color to be distinguishable from other roads. When actually driving the vehicle, the driver can therefore readily reach his destination.

One known method for providing an optimal route which joins a departure point and a destination is based on a horizontal exploration technique. In this method, road data is referenced to retrieve all intersections in one or multiple adjoining quarter drawings which cover the whole of a square area whose diagonal is a straight line joining a departure point and a destination (including not only authentic intersections but also simple nodes serving as adjacent nodes). (See Appendix for further detail of both the horizontal and Dijkstra exploration.)

According to the known Dijkstra exploration technique, the shortest route can be explored more accurately than the horizontal exploration technique. However, the Dijkstra technique exploration speed is slower than that of the horizontal exploration technique.

In either the horizontal or the Dijkstra technique, even when a route exploration zone is limited to a square area whose diagonal is a straight line joining a departure point and a destination, since all routes included in the area are explored, it takes considerable time to complete the exploration. A driver therefore must wait for a long period of time before receiving route guidance.

As a solution to the above problem, a heuristic exploration technique has been proposed based on experience, where an optimal route resides in a zone defined by a straight line joining a departure point and a destination. Routes deviating from the direction to the destination from the departure point are "trimmed away" or the distances of the routes are weighted, to lower the priorities of such routes. Thus, unnecessary routes are not explored.

However, if a route to be explored is in a suburban or rural area the density of roads is low, only detours (indirect routes) are sometimes available. For example, in FIG. 25, after exploration proceeds to a node $CP_x$ near a destination, unless a route A deviating from the direction to the destination from the departure point is selected, the destination may not be arrived at. However, in such a heuristic exploration, route A is trimmed away, which disables exploration of an optimal route leading to the destination. Due to the lowered priority of route A, disadvantageously it takes excessive time to explore route A.

SUMMARY OF THE INVENTION

Accordingly, the present invention provides a route exploration method permitting accurate exploration of an optimal route according to the road density in an exploration object zone.

The method in accordance with the present invention references road data and determines whether an exploration object zone lies, e.g. in an urban (high road density) or suburban (low road density) district. When the exploration object zone lies in an urban district, the method executes heuristic exploration (based on e.g., the horizontal or Dijkstra technique) in which routes deviating from the direction specified by a straight line joining a departure point and a destination are trimmed away, or the priorities of the routes are lowered. When the exploration object zone lies in a suburban district, the method executes normal non-heuristic exploration (again based on the horizontal or Dijkstra technique).

According to the present invention, road data is referenced to determine whether an exploration object zone lies in an urban or suburban district. (Other definitions of road situations are clearly usable in accordance with the invention, including more than two categories). When the exploration object zone lies in an urban district, heuristic exploration is executed: routes deviating from the direction specified by a straight line joining the departure point and the destination are trimmed away or the priorities of such routes are lowered. When the exploration object zone lies in a suburban (non-urban) district, normal non-heuristic exploration is executed. Thus when the exploration object zone lies in an urban district in which the density of roads is high, an optimal route can thereby be explored in a short period of time. When the exploration object zone lies in a suburban district in which the density of roads is low, an optimal route can be explored reliably. Exploration failure does not occur and route exploration does not require excessive time.

BRIEF DESCRIPTION OF THE DRAWINGS

FIG. 2 shows an intersection network list;

FIG. 9 shows a drawing used to create intersection network lists;

FIG. 12 shows an intersection network list relating to a variant of the present invention;

DETAILED DESCRIPTION OF THE INVENTION

Overall Configuration

Figure 1:
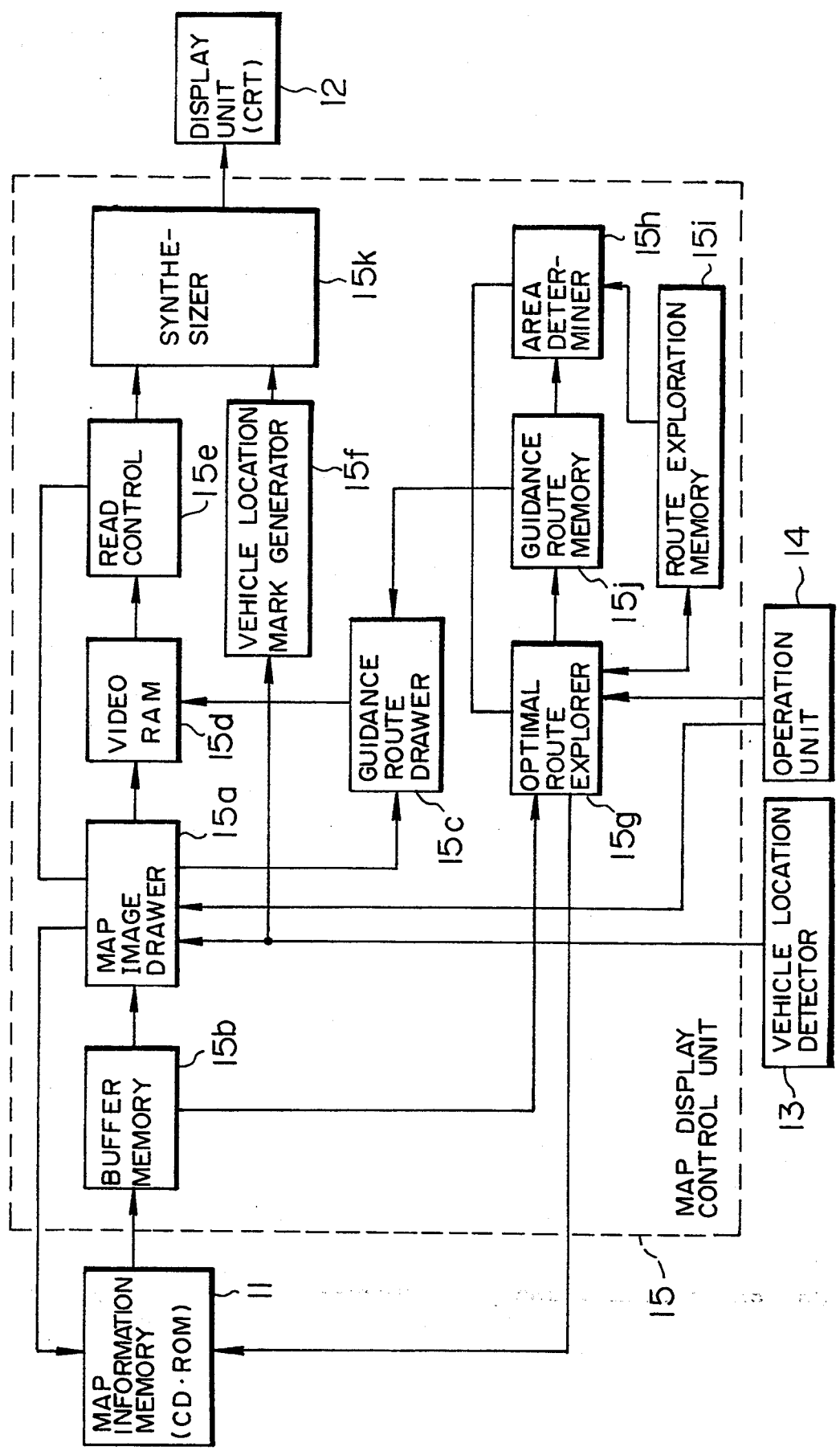
FIG. 1 shows an on-vehicle navigator in which a route exploration method of the present invention is implemented.

FIG. 1 shows the overall configuration of an on-vehicle navigator for a route exploration method in accordance with the present invention. In FIG. 1, a CD ROM 11 (map information memory) stores map data. The map data includes a road layer, a background layer, and a character layer. A display unit 12 (CRT) displays a map image and vehicle location mark associated with a current location of a vehicle, and a guidance route explored by optimal route exploration. A vehicle location detector 13 calculates a current location of the vehicle on the basis of the travel distance and azimuth of a traveling vehicle. The vehicle location detector 13 includes a conventional azimuth sensor for detecting an azimuth in which the vehicle is moving, a conventional distance sensor for detecting travel distance, and a location calculation CPU (microprocessor) for calculating a current location (longitude and latitude) of the vehicle on the basis of the azimuth and travel distance.

Operation unit 14 has a map retrieval key, an enlargement/reduction key, a map scroll key, and a route guidance mode key. Map display control unit 15 uses map data to produce a map image showing a current location of a vehicle and surrounding areas, and generates a vehicle location mark and a guidance route image.

For map display control unit 15, map image drawer 15 reads map data, which represents a large range around a current location that is larger than a screen display range (for example, map data for nine screens), from the CD ROM 11. stores the read map data in a buffer memory temporarily, and produces map images, which are dot Images, using the map data. Buffer memory 15 temporarily stores map data read from the CD ROM 11. Guidance route drawer 15c produces guidance route images using guidance route data resulting from optimal route exploration. Video RAM 15 stores map images and guidance route images. The map image drawer 15a updates the contents of the video RAM 15d according to the travel of the vehicle so that the display range of a display screen will not exceed an image range specified in the video RAM 15d. The guidance route drawer 15c produces guidance route images according to the travel of a vehicle and stores the images in the video RAM 15d.

Read controller 15e reads a map image for one screen from the video RAM 15d so that a current location of a vehicle appears in the center of the display screen. A read address is instructed by the map image drawer 15a. Vehicle location mark generator 15f displays a vehicle location mark in the center of the display screen. The vehicle location mark generator 15f inputs vehicle azimuth data from the vehicle location detector 13 and generates a vehicle location mark oriented in the direction specified in the data.

After a route guidance mode is selected, and when a destination is entered, the optimal route explorer 15g reads map data defining one or multiple adjoining quarter drawings which cover a square area whose diagonal is a straight line joining a departure point and the destination from the CD ROM 11 in consideration of the positional relationship between a location of the vehicle (departure point) and the destination. While reading the drawings, the optimal route explorer 15g creates intersection network lists and stores them in the route exploration memory. Using the horizontal exploration technique, the optimal route explorer 15g explores an optimal route (shortest route) linking the departure point and the destination. When a route exploration object zone lies in an urban (high road density) district, the optimal route explorer 15g executes heuristic exploration. For a suburban (other) district, the optimal route explorer 15g executes normal exploration.

Area determiner 15h determines whether a route exploration object zone lies in an urban or suburban district, and reports the result of the determination to the optimal route explorer. In general, the density of intersections differs between urban and suburban districts. The density is high in an urban district, while it is smaller in a suburban district. The area determiner 15h checks the density of intersections to determine whether an object zone lies in an urban or suburban district. Specifically, for example, when intersection network lists have been created, a density of intersections (number of intersections per unit area) is calculated by dividing the total number of intersections corresponding to the total number of intersection network lists by the size of an object area for which intersection network lists are created. The calculated value is then compared with a reference value, or in this example, 1000 intersections per 100 km². If the calculated value is larger than the reference value, an "urban area" is identified. If the calculated value is smaller than the reference value, a "suburban area" is identified.

The number of intersections included in a route exploration object zone may be provided by counting the number of nodes, for each of which an intersection ID flag is set, in a node table NDTB included in road data defining each quarter drawing read from the buffer memory 15b or by counting the number of intersections defined in an intersection node list CRLT. Alternatively, the number of intersections may be estimated in terms of a capacity of the route exploration memory 15i occupied by intersection network lists or of the sum of the sizes of the intersection node lists CRLT in road data defining each quarter drawing.

Data specifying an urban or suburban district may be added to map data in units of a quarter drawing or drawing. The data may be referenced to determine whether a route exploration object zone lies in an urban or suburban district.

Route exploration memory 15i is connected to the optimal route explore and stores road data including intersection network lists. Guidance route memory 15j stores a node array forming an optimal route as guidance route data. The route exploration memory 15i or guidance route memory 15j preserves data owing to a conventional backup power supply, even when the power supply of the on-vehicle navigator is turned off.

Synthesizer 15k synthesizes a map image and a guidance route image, which are read from the video RAM 15d and vehicle location mark generator 15f respectively, and a vehicle location mark image, and outputs the synthetic data to the display unit 12 for image display.

Map Data

Figure 19:
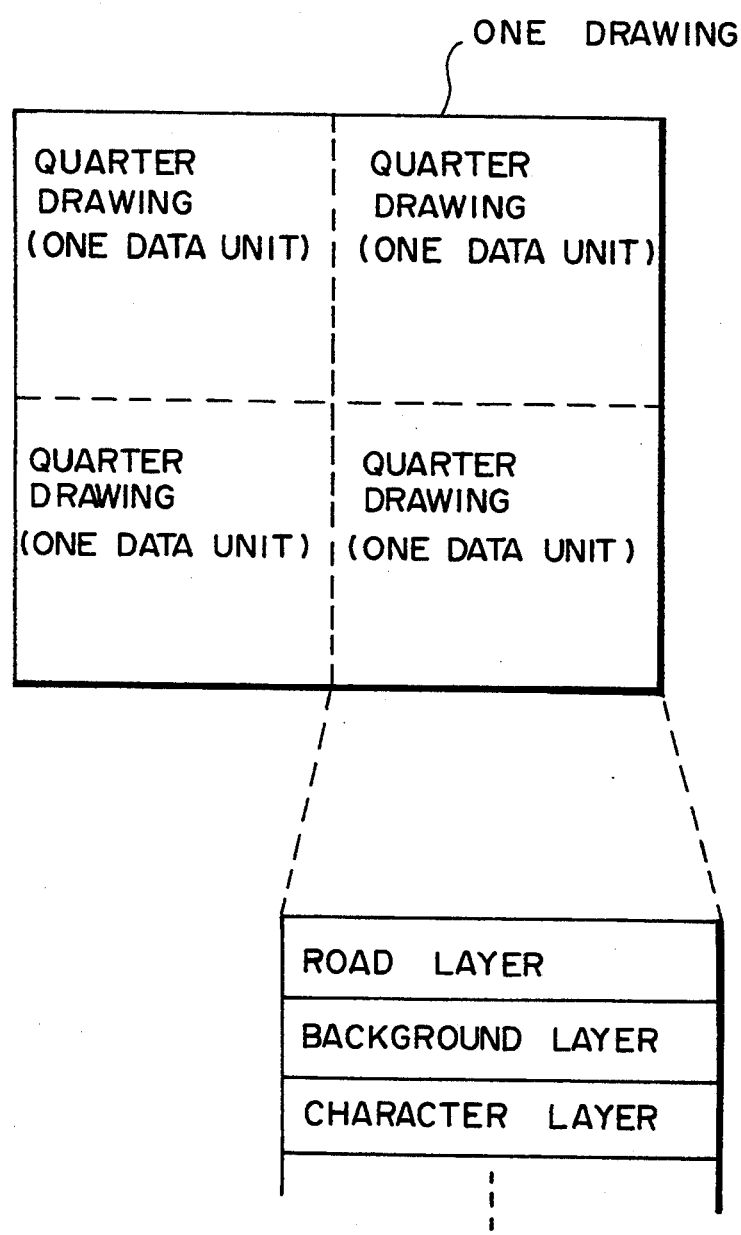
FIG. 19 shows a data structure of map data in a CD ROM.
Figure 20:
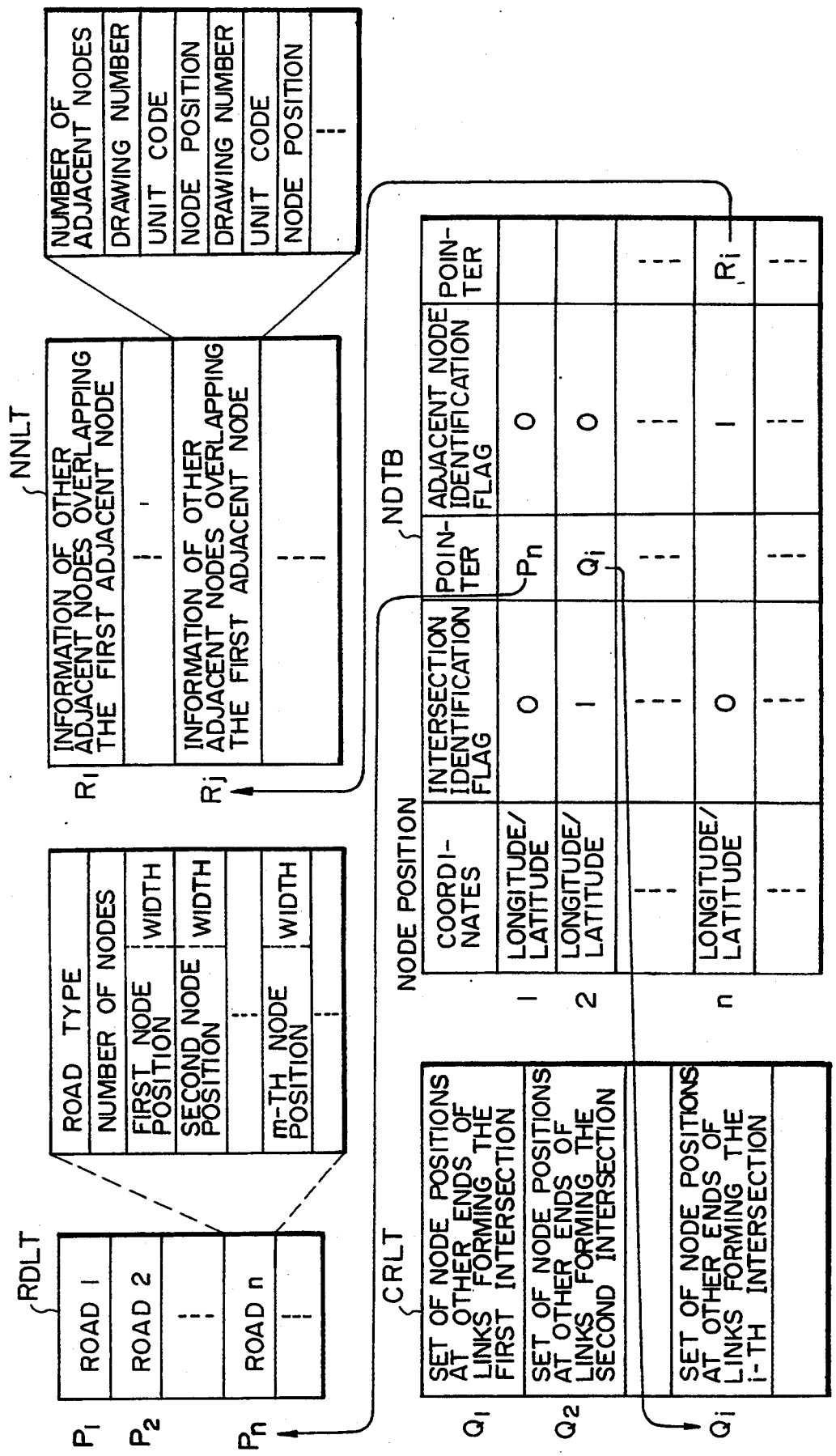
FIG. 20 shows a data structure of a road layer.
Figure 21A:
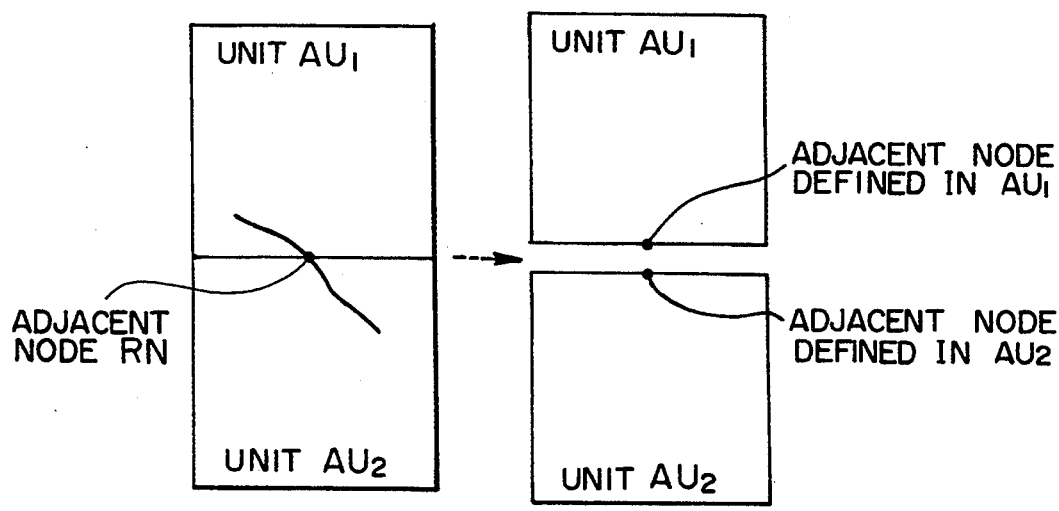
FIGS. 21a, 21b shows an adjacent node.
Figure 21B:
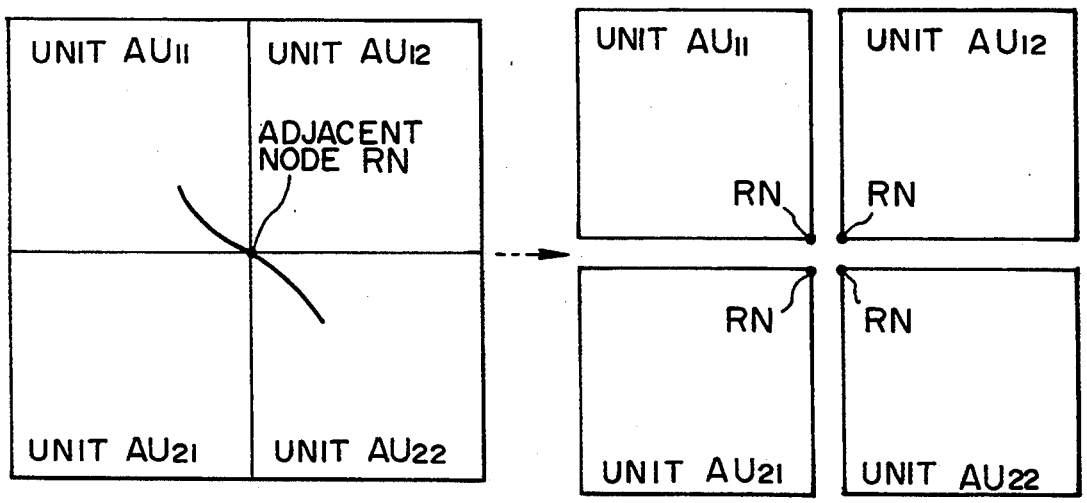

A map stored in CD ROM 11 is segmented into drawings each having an appropriate longitudinal width and latitudinal width. The map data defining each drawing is divided into four data units (associated with four quarter drawings) corresponding to one screen (see FIG. 19). In the map data, a road or the like is represented as a set of coordinates of vertices (nodes) expressed by longitudes and latitudes, and drawn by plotting the nodes using straight lines sequentially. A road is formed by joining two or more nodes. Two nodes are joined to form what is referred to as a link. The map data includes (1) a road layer containing a road list, a node table, an intersection node list, and an adjacent intersection list, (2) a background layer containing data for displaying roads, buildings, and rivers in a map screen, and (3) a character layer containing data for displaying municipal names and road names. The road layer has the data structure shown in FIG. 20, containing a road list RDLT, and intersection node list CRLT, a node table NDTB, and an adjacent node list NNLT.

Intersection Network List

Intersection network lists created by the optimal route explorer 15b have the format of FIG. 2. For each authentic intersection (intersection nodes which may or may not adjacent nodes) as well as simple nodes serving as adjacent nodes, the following items are stored:

(1) Intersection sequential number (information specifying the intersection)
(2) Drawing number of a map containing the intersection
(3) Data unit code
(4) Address in the node table
(5) Longitude
(6) Latitude
(7) Address in the intersection component node list
(8) Number of intersection nodes
(9) Address in the adjacent node list
(10) Number of adjacent nodes
(11) Sequential numbers of adjacent intersections
(12) Distances from the intersection to the adjacent intersections
(13) Sequential number of an intersection preceding the intersection
(14) Total distance from the departure point to the intersection
(15) Retrieval degree of the intersection where, items (1) to (6) specify intersection ID, and items (13) to (15) are registered when route exploration is executed.

Figure 10:
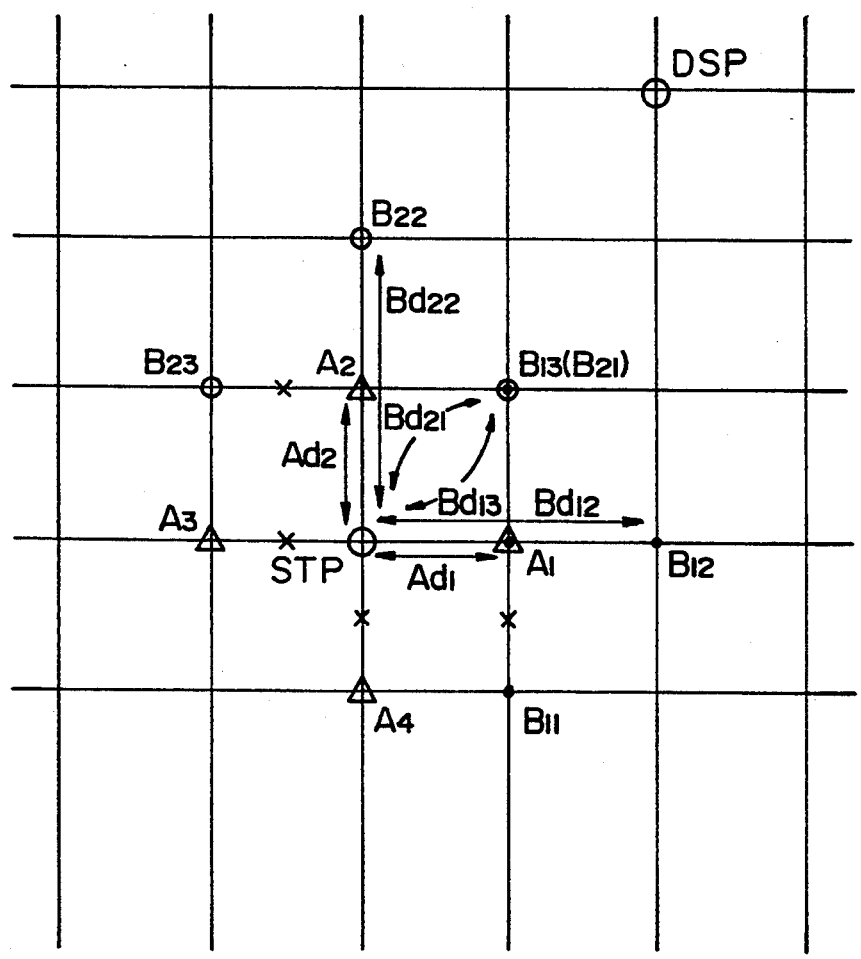
FIG. 10 shows a route exploration method based on a horizontal exploration technique.
Figure 11:
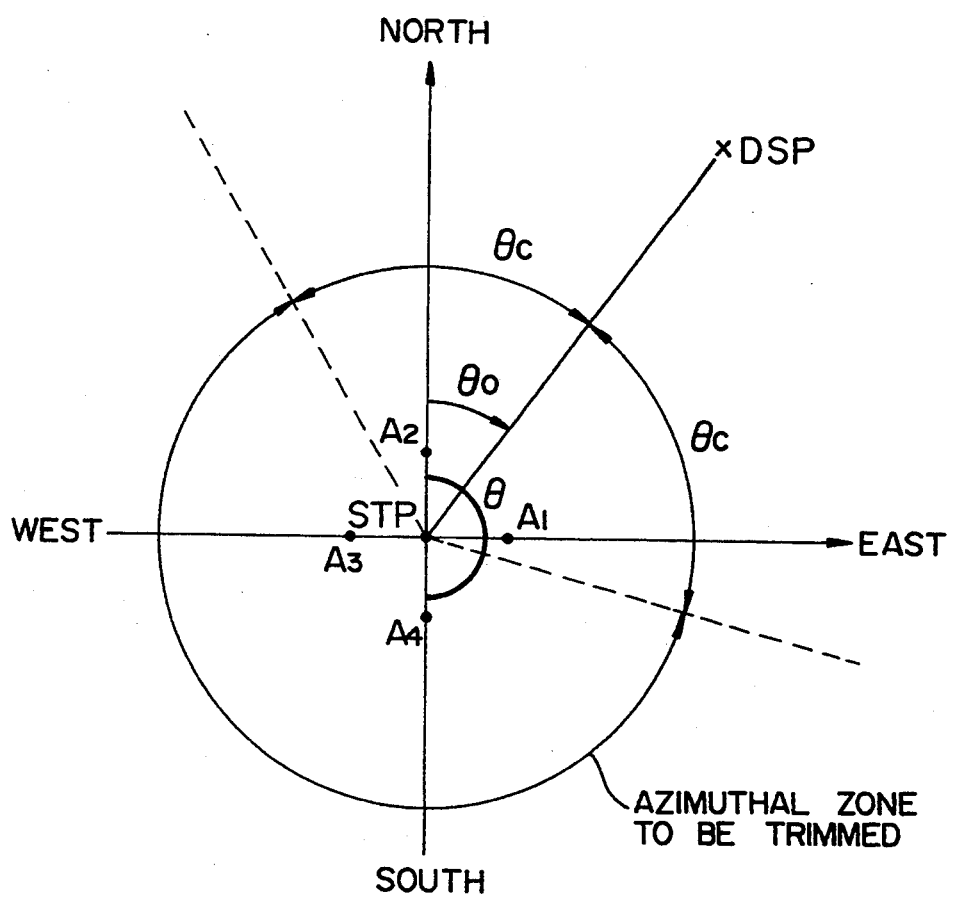
FIG. 11 shows trimming.

FIGS. 3 to 8 are flowcharts showing the processing by the map display control unit 15. FIG. 9 shows a drawing used to create intersection networks. FIG. 10 shows route exploration based on the horizontal exploration technique. FIG. 11 shows trimming.

Figure 3:
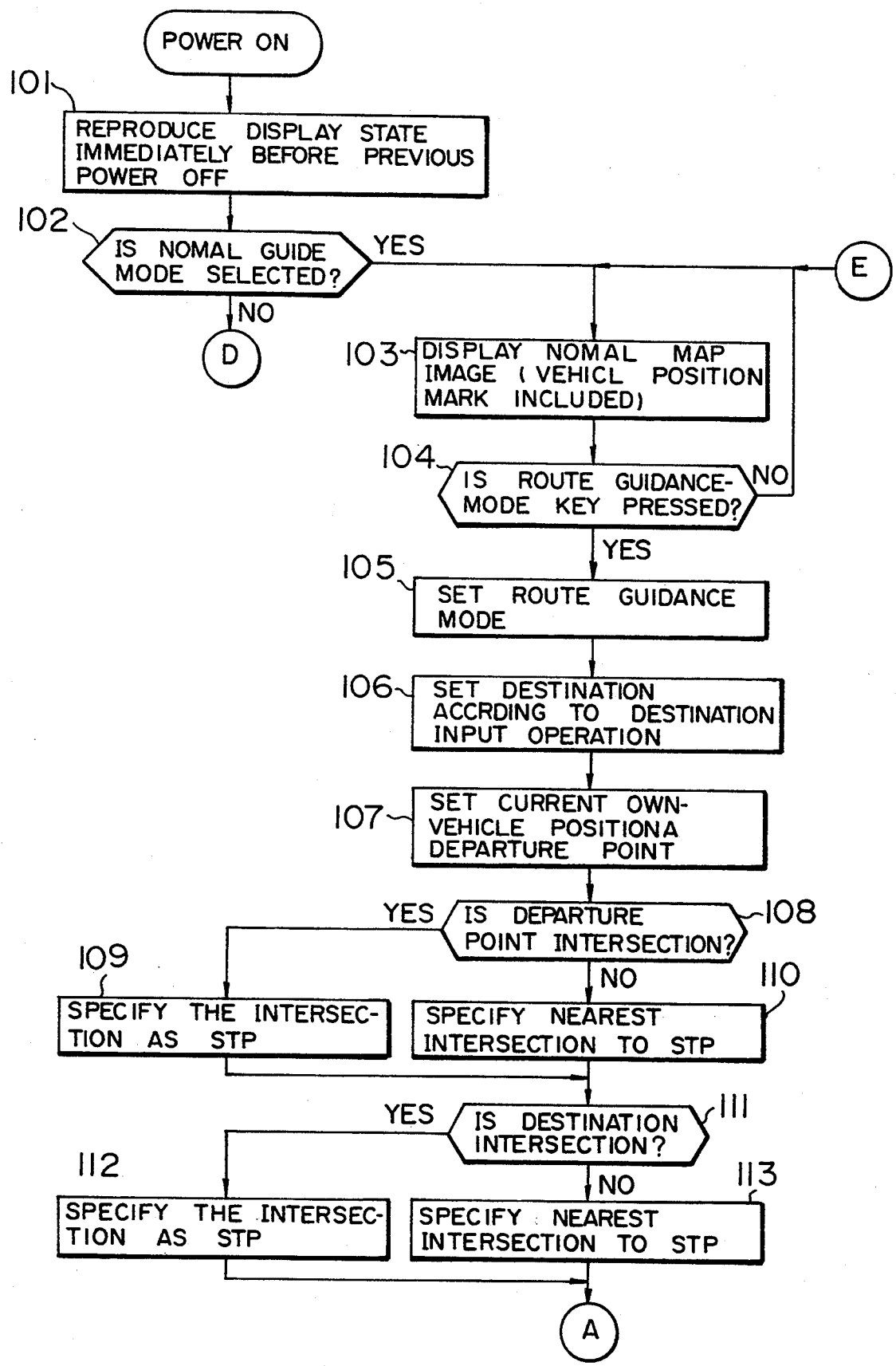
FIGS. 3 to 8 are flowcharts showing operation of a map display control unit.

Re-setting a State Established Immediately before Power is Turned Off by Turning Power On When the power supply of the on-vehicle navigator is turned on, the map display control unit 15 re-sets a map image display state established immediately before the power supply is turned off (step 101 in FIG. 3). Assuming that a normal guide mode is reproduced, the map image drawer 15a first reads drawing management information from the CD ROM 11 into the buffer memory 15b. Referencing the drawing management information, the map image drawer 15b reads map data defining multiple drawings showing a location of an own vehicle and surrounding areas from the CD ROM 11 into the buffer memory 15b. Map images showing the location of an own vehicle and surrounding areas and constructing nine screens are produced in the video RAM 15d. Based on vehicle location data sent from the vehicle location detector 13, the map image drawer 15a allows the read controller 15e to cut out a map image that is centered on the location of a vehicle in the centers and constructs one screen. The cutout image is then output to the synthesizer 15k. The vehicle location mark generator 15f generates a specific vehicle location mark oriented in the direction specified in vehicle azimuth data detected by the vehicle location detector 13, and outputs the mark to the synthesizer 15k. The synthesizer 15k superposes the vehicle location mark on the map image, and outputs the superposed image to the display unit 12 for screen display. The map image showing the location of an own vehicle and surrounding areas are thus displayed together with the vehicle location mark in a screen.

When the power supply was turned off, if a route guidance mode was selected, after the power supply is turned on, the route guidance mode is set up. At step 101, aside from the aforesaid processing by the map image drawer 15a, the guidance route drawer 15c references the vehicle location data and selects the portion of guidance route data, which is stored in the guidance route memory 15j, defining an area produced in the video RAM 15d, and produces a guidance route highlighted with a boldface line in a specific color in the video RAM 15d. Consequently, the map image showing the location of an own vehicle and surrounding areas is displayed together with the vehicle location mark and the optimal guidance route linking the departure point and the intersection.

Preparing for Route Exploration

After the power supply is turned on, when the normal guide mode is re-set, if a driver intends to drive to a desired destination in the route guidance mode, the driver presses the route guidance mode key on the operation unit 14. The route guidance mode is then set up (the result of step 4 in FIG. 3 is in the affirmative) (step 105). When the map retrieval key is then pressed, the map image drawer 15a displays a map image showing the destination in a display screen. Thereafter, the map scroll key is pressed to position the vehicle location mark at the destination. The destination is thus designated (step 106).

Figure 4:
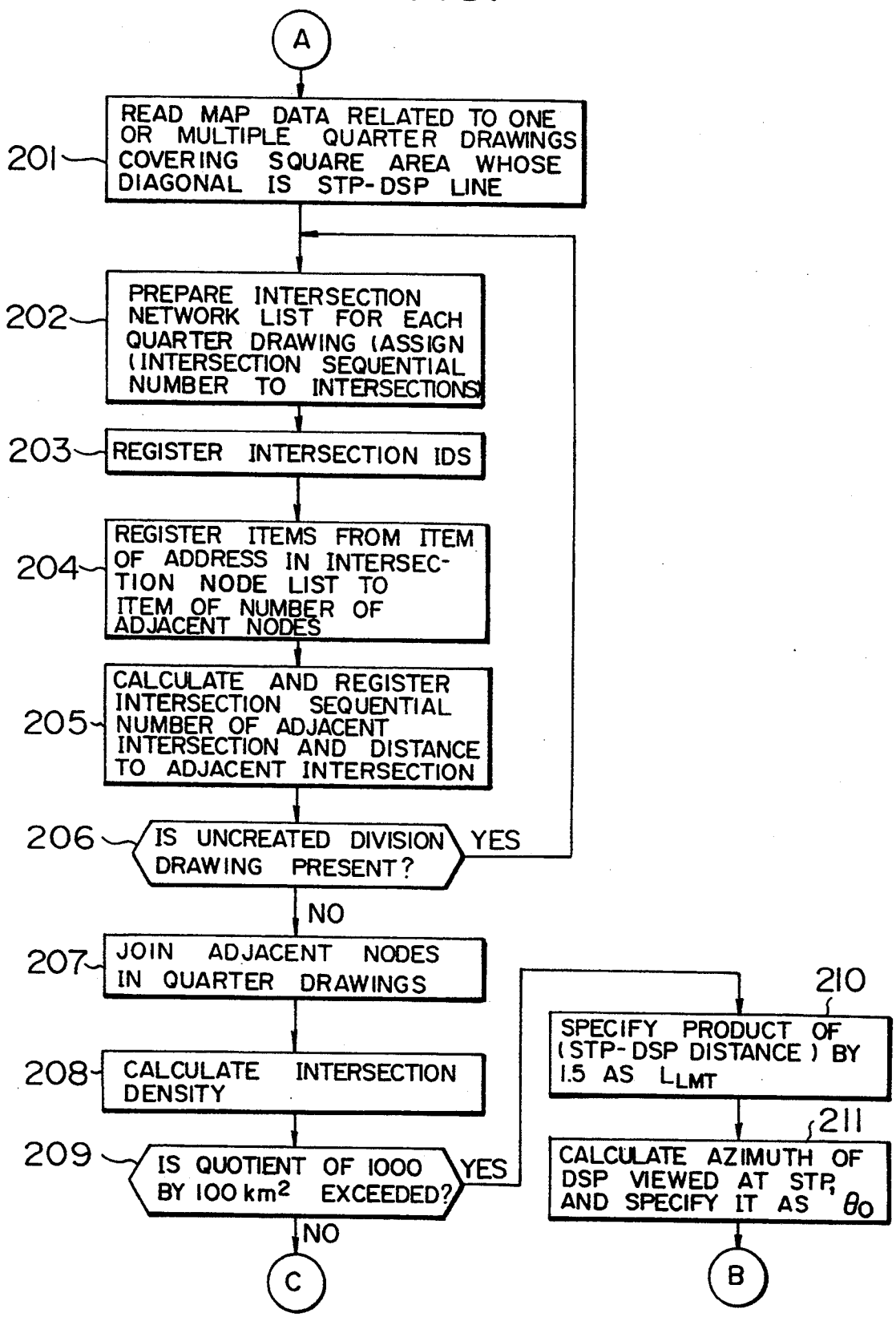

When the destination is designated, the optimal route explorer 15g autonomously specifies the current location of the vehicle as the destination (step 107). Based on the map data of a drawing containing a departure point, a check is made if the departure point is an intersection defined by road data (an authentic intersection node or a simple node serving as an adjacent node) (step 108). If the departure point is an intersection, the departure point is specified as a departure point intersection STP (step 109). The processing of step 111 (and following steps) is then carried out. If the departure point is not an intersection, the nearest intersection defined by road data is specified as the departure point intersection STP (step 110). The processing of step 111 (and following steps) is then carried out. When the departure point intersection STP is determined, the optimal route explorer 15g checks if the destination is an intersection defined by road data (an authentic intersection node or a simple node serving as an adjacent node, step 111). If the destination is an intersection, the destination is specified as a destination intersection DSP (step 112). The processing of step 201 (and following steps) in FIG. 4 is then carried out. If the destination is not an intersection, the nearest intersection of the destination is specified as the destination intersection DSP (step 113). The processing of the step 201 (and following steps) is then carried out.

When the departure point intersection STP and destination intersection DSP are specified, the optimal route explorer 15g references drawing management information, and fetches one or multiple quarter drawings covering a square area whose diagonal is a straight line joining the departure and destination. Map data defining the quarter drawings are read from the CD ROM 11 into the buffer memory 15b (step 201 in FIG. 4). Road data associated with each quarter drawing is used to create intersection lists for respective intersections (authentic intersection nodes or simple nodes serving as adjacent nodes) in the route exploration memory 15h (processing of step 202 and following steps).

In FIG. 9, the quarter drawings used to create intersection network lists are $BU_{11}$ to $BU_{33}$. First, intersection nodes for which intersection ID flags are set, and simple nodes for which intersection ID flags are reset but adjacent node ID flags are set, are retrieved from the node table NDTB included in the data unit in which one of the quarter drawings, $BU_{11}$, is defined. Intersection network lists, which are assigned intersection sequential numbers in ascending order starting with 1, are placed in the route exploration memory. Intersection ID data (items (0) to (5) in FIG. 2, steps 202 and 203) are registered in each intersection network list. The node table NDTB, intersection node list CRDT, and adjacent node list NNLT are referenced for each intersection to fetch an address in the intersection component node list, the number of intersection nodes, an address in the adjacent node list, and the number of adjacent nodes. The fetched data are then registered as items (6) to (9) in FIG. 2 in the associated intersection network list.

Next, the node table NDTB is referenced for each road in the road list RDLT to calculate a length of a link between each pair of adjoining intersections (one of which may be a simple node serving as an adjacent node). The other intersection of each link is registered as an adjacent intersection in the intersection network list concerning one intersection of the link. An intersection sequential number (adjacent intersection sequential number) is registered in the intersection network list for the adjacent intersection and the distance of the link are also registered in the intersection network list for one intersection of the link (items (10) to (124) in FIG. 2, step 205).

The foregoing processing is repeated for the quarter drawings $BU_{12}$ to $BU_{33}$ in FIG. 9 (step 206). The operations of steps 202 to 205 are repeated. When an object for which an intersection network list is created is an intersection node serving as an adjacent node or a simple node serving as an adjacent node, another intersection network list may be created for the same node in other sharing data unit (See the adjacent nodes $RN_1$ and $RN_2$ in FIG. 9). In this case, the adjacent node list NNLT is referenced to retrieve the intersection sequential numbers specified in all the other sharing units. The retrieved intersection sequential numbers and zero are registered as adjacent intersection sequential numbers and distances in the intersection network list for the node. Finally, adjacent node linkage involving quarter drawings is executed (step 207).

When intersection network lists have been created for each of one or multiple quarter drawings covering a square area whose diagonal is a straight line joining a departure point and a destination, the area determiner 15h checks a maximum intersection sequential number and becomes aware of the total number of intersection network lists (corresponding to the total number of intersections) created in the route exploration memory 15i. The area determiner 15h then calculates a density of intersections by dividing the total number of intersection network lists by the size of a current route exploration object zone (a sum of the sizes of quarter drawings $BU_{11}$ to $BU_{33}$) (step 208). Next, the calculated density of intersections is compared with a certain reference value, or in this example, 1000 intersections per 100 $km^2$. Based on the result of the comparison, it is determined whether the route exploration object zone lies in an urban or suburban district (step 209). The result is reported to the optimal route explorer 15g.

Route Exploration (Urban District)—Heuristic Horizontal Technique

When the density of intersections is high, an urban district is identified. The optimal route explorer 15g then explores an optimal route linking a departure point and a destination using intersection network lists according to the horizontal exploration technique based on a heuristic approach (see Fig 10).

When the density of intersections is high, the density of roads is high. This means that a place to which only a detour (indirect route) leads is not present. Heuristic exploration, in which routes deviating from the direction to a destination relative to a departure point are trimmed away, will thereby not disable (prevent) exploration of an optimal route.

First, the optimal route explorer 15g calculates a distance between a departure point intersection STP and a destination intersection DSP, multiples the calculated distance by 1.5, and registers the multiplied distance as a value $L_{LMT}$ in the route exploration memory 15i (step 210). The value $L_{LMT}$ is used as a reference for trimming away routes; routes whose total distances exceed the value $L_{LMT}$ are trimmed away. The azimuth $\theta_0$ of the destination intersection DSP with respect to the departure intersection STP (an angle measured clockwise with respect to the north) is calculated (See FIG. 11) and stored in the route exploration memory 15i (step 211). The value $\theta_0$ is used to trim away routes deviating from the direction to a destination relative to the departure point.

The optimal route explorer 15g first sets 0 as a retrieval degree (step 301 in FIG. 5), and then references the intersection network list CRNL for the departure point intersection STP to see if another intersection adjoins the zero-order intersection (departure point intersection) (step 302). At step 302, intersections which have been regarded as the j-th intersections (j=0, 1, etc., and i) are discarded.

If adjacent intersections are present, the azimuth $\theta$ of one of the adjacent intersections, $A_4$, with respect to the zero-order intersection is calculated (step 303, see FIG. 11). It is then determined whether the absolute value of a difference from the value $\theta_0$ is equal to or smaller than a certain value $\theta_0$ (herein, $\theta_c = 67.5°$ ) (step 304). The azimuth $\theta$ is calculated using a trigonometric function of the coordinates of the longitude and latitude of the zero order intersection, which are read from the intersection network list for the zero-order intersection, and the coordinates of the longitude and latitude of the adjacent intersection $A_4$, which are read from the intersection network list of the adjacent intersection $A_4$ pointed to by the intersection sequential number of the adjacent intersection $A_4$ stored in the intersection network list for the zero-order intersection. The longitudinal and latitudinal coordinates are stored as items (5) and (6) in the intersection network list shown in FIG. 2.

When the result of the operation at step 304 is in the affirmative, the optimal route explorer 15g refrains from trimming away a route linking the zero-order intersection and the adjacent intersection $A_4$ because the route does not deviate from the direction to the destination. When the result of the operation at step 304 is in the negative, the route is trimmed away because it deviates greatly from the direction to the destination (See FIG. 10).

Since the result of the operation at step 304 is in the negative, control is returned to step 302. The intersection network list for the zero-order intersection is referenced to see if another intersection adjoins the zero order intersection. Since the adjacent intersection $A_1$ is present, the azimuth $\theta$ of the adjacent intersection $A_1$ with respect to the zero-order intersection is calculated. It is determined whether the absolute value of a difference from the value $\theta_0$ is equal to or smaller than the certain value $\theta$ (herein, $\theta_c = 67.5°$, steps 303 and 304).

Since the result of the operation at step 304 is in the affirmative, the total distance D from the departure point intersection STP to the adjacent intersection $A_1$ is calculated (step 305). The distance D value is provided according to the following expression:

$$d_1 + d_2 = D$$

where, $d_1$ denotes a total distance from the departure distance STP to the i-th intersection, and $d_2$ denotes a distance from the i-th intersection to the adjacent intersection $A_1$. When i represents zero, the $d_1$ value is zero. The D value therefore equals to the $d_2$ value. The $d_2$ value is stored as item (11) or (13) in the intersection network list CRNL for the departure point intersection STP as shown in FIG. 2.

Next, it is checked if the value provided as the total distance D exceeds the value $L_{LMT}$ (step 3.06). If the D value is lower, items (25) and later in FIG. 2 in the intersection network list CRNL for the adjacent intersection $A_1$ are referenced to see if total distances of other routes and information specifying a preceding intersection (intersection sequential number) have been registered (step 307). Since the result of the operation at the step 807 is in the negative, the data listed below are registered as items (25) to (27) in FIG. 2 in the intersection network list CRNL for the adjacent intersection $A_1$ (step 308).

(A) Intersection sequential number of the zero-order intersection STP concerned;
(B) Total distance from the zero-order intersection STP to the adjacent intersection $A_1$;
(C) (i+1)=1 as a retrieval degree of the adjacent intersection $A_1$.

Thereafter, control is returned to the step 302. The intersection network CRNL for the departure point intersection STP is referenced to see if another intersection adjoins the zero-order intersection concerned. If an adjacent intersection is present, the foregoing processing is repeated.

Since an adjacent intersection $A_2$ is present, the azimuth $\theta$ of the adjacent intersection $A_2$ with respect to the zero-order intersection is calculated. It is determined whether the absolute value of a difference from the value $\theta_0$ is equal to or smaller than the value $\theta_c$. Since the result of the determination is in the affirmative, the total distance D from the departure point intersection STP to the adjacent intersection $A_2$ is calculated in the same manner as that to the intersection $A_1$. If the value provided as the total distance D is smaller than the value $L_{LMT}$, the total distance D is registered together with the intersection sequential number of the zero-order intersection and retrieval degree (i+1) in the intersection network list for the adjacent intersection $A_2$ (steps 302 to 308). Control is then returned to the step 302.

Although another adjacent intersection $A_3$ is present, since the absolute value of a difference of the azimuth $\theta$ with respect to the zero-order intersection from the value $\theta_0$ exceeds the value $\theta_c$ (the result of the operation at step 304 is in the negative), control is not passed beyond the step 305. Trimming is then executed.

As a result, the adjacent intersections $A_1$ to $A_4$ reside in the intersection network list for the departure point intersection STP. Among the adjacent intersections, the intersections $A_1$ and $A_2$ alone are regarded as the first intersections. An intersection sequential number of a preceding intersection (herein, the departure point intersection STP) and a total distance from the departure point that is a value $Ad_1$ or $Ad_2$, and a retrieval degree 1 are stored in the intersection network list CRNL for each of the first intersections $A_1$ and $A_2$.

On the other hand, the above data are not stored in the intersection network list for each of the adjacent intersections $A_3$ and $A_4$.

When completing processing all the adjacent intersections existent in the intersection network list CRNL for the departure point intersection STP, the optimal route explorer 15g determines whether another zero-order intersection is present aside from the departure point intersection STP (step 309). Since another zero-order intersection is absent, it is determined whether the destination intersection DSP has linked up; that is, whether the destination intersection DSP is included in the (i+1)-th intersections (step 310). If the destination intersection DSP is not included, the value i is incremented to 1 (step 311).

When one of the first intersections, for example, an intersection $A_1$ is concerned, the intersection network list for the intersection $A_1$ stored in the route exploration memory 15i is referenced to determine whether another adjacent intersection is present aside from those regarded as the zero-order intersections and first-order intersections (step 302). Intersections $B_{11}$, $B_{12}$, and $B_{13}$ are present. The intersection network lists for the intersection $A_1$ and one of the adjacent intersections, for example, $B_{11}$ are referenced to calculate the azimuth $\theta$ of the adjacent intersection $B_{11}$ with respect to the first intersection $A_1$. It is then determined whether the absolute value of a difference from the value $\theta_0$ is equal to or smaller than the value $\theta_c$ (steps 303 and 304). Since the result of the determination is in the negative, control is not passed beyond the step 305. A route leading to the intersection Bi from the intersection $A_1$ is trimmed away. Control is returned to the step 302. It is then checked if another intersection adjoins the intersection $A_1$.

Since an adjacent intersection $B_{12}$ is present, the azimuth $\theta$ of the adjacent intersection $B_{12}$ with respect to the intersection $A_1$ is calculated. It is then determined whether the absolute value of a difference from the value $\theta_0$ is equal to or smaller than the value $\theta_c$ (steps 303 and 304). Since the result of the determination is in the affirmative, the intersection network list for the intersection $A_1$ is referenced to calculate the total distance D of a route linking the departure point intersection STP, the first intersection $A_1$ concerned, and the adjacent intersection $B_{12}$ (step 305). A total distance $Ad_1$ from the departure point intersection STP to the first intersection $A_1$ concerned and a distance $d_2$ from the first intersection $A_1$ to the adjacent intersection $B_{12}$ are registered as items (26) and (11), (13), or (15) in FIG. 2 in the intersection network list CRNL for the intersection $A_1$. The total distance D from the departure point intersection STP to the adjacent intersection $B_{12}$ is therefore calculated according to the following expression:

$$Ad_1 + d_2 = D$$

Next, it is checked if the value provided as the total distance D is smaller than the value $L_{LMT}$ (step 306). If the result of the check is in the affirmative, the intersection network list CRNL for the adjacent intersection $B_{12}$ is referenced to check if (i+1)=2 is stored as a retrieval degree of item (27) in FIG. 2 (step 307). Since the result of the check is in the negative, the data listed below are stored as items (25) to (27) in FIG. 2 in the intersection network list CRNL for the adjacent intersection $B_{12}$ (step 305):

(A) Intersection sequential number of the first intersection $A_1$ concerned;
(B) Total distance from the departure point to the adjacent intersection $B_{12}$;
(C) (i+1)=2 as a retrieval degree of the adjacent intersection $B_{12}$.

Control is then returned to step 302. If another intersection adjoins the first intersection $A_1$, the foregoing processing is repeated.

An adjacent intersection $B_{13}$ is present. The azimuth $\theta$ of the adjacent intersection $B_{13}$ with respect to the first intersection $A_1$ concerned is calculated. It is then determined whether the absolute value of a difference from the value $\theta_0$ is equal to or smaller than the value $\theta_c$. Since the result of the determination is in the affirmative, the total distance D from the departure point intersection STP to the adjacent intersection $B_{13}$ is calculated in the same way as that to the intersection $B_{12}$. The total distance D is then stored together with the intersection sequential number of the first intersection $A_1$ and a retrieval degree (i+1) in the intersection network list for the adjacent intersection $B_{13}$ (steps 303 to 308). Control is then returned to step 302.

As a result, the adjacent intersections $B_{11}$ to $B_{13}$ reside in the intersection network list for the first intersection $A_1$ aside from the departure point intersection. Among the adjacent intersections, the intersections $B_{12}$ and $B_{13}$ alone are regarded as the first intersections. An intersection sequential number of a preceding intersection, a total distance from the departure point that is the value $Bd_{12}$ or $Bd_{13}$, and a retrieval degree 2 are stored in the intersection network list CRNL for each of the first intersections.

On the other hand, the above data are not stored in the intersection network list for the intersection $B_{11}$.

Upon completing processing all the adjacent intersections existent in the intersection network list CRNL for the intersection $A_1$, the optimal route explorer 15g determines whether another first intersection is present aside from the intersection $A_1$ (step 309). Since an intersection $A_2$ is present, the intersection $A_2$ is regarded as a new first intersection (step 312). The processing of step 302 and later is repeated. Adjacent intersections $B_{21}$ to $B_{23}$ reside aside from the departure point intersection in the intersection network list for the intersection $A_2$. Among them, the intersections $B_{21}$ and $B_{22}$ are not trimmed away at step 304. However, the intersection $B_{23}$ is trimmed away because the absolute value of a difference between the values $\theta$ from $\theta_0$ exceeds the value $\theta_c$.

As for the intersection $B_{21}$, when the result of step 306 is in the affirmative, the intersections $B_{13}$ and $B_{21}$ are mutually duplicative. Since the degree of the adjacent intersection $B_{13}$ is set to 2, the result of the operation at step 307 is in the affirmative. This means that the intersection $B_{21}$ has already been processed as the intersection $B_{13}$ adjoining the first intersection $A_1$ (the aforesaid data (A) to (C) have already been stored). In this case, the total distance D calculated at step 303 is compared to the total distance D', which has a value equal to a value $Bd_{13}$, from the departure point STP registered in the intersection network list CRNL for the adjacent intersection $B_{13}$ (step 313).

If the D value is larger than the D' value, the intersection sequential number of the i-th intersection $A_1$ registered as item (25) in FIG. 2 in the intersection list CRNL for the adjacent intersection $B_{13}$ ($=B_{12}$) is updated with the intersection sequential number of the i-th intersection $A_2$ concerned, and the value stored as the total distance D' of item (26) therein is updated with the value $Bd_{21}$ provided as the total distance D (step 313). Thereafter, control is returned to step 302. When the D value is equal to or larger than the D' value, the contents of items (25) and (26) in FIG. 2 in the intersection network list CRNL for the intersection $B_{13}$ ($=B_{21}$) are not modified. Control is returned to step 302.

When the specified processing has been completed for the adjacent intersections of the intersection $A_2$, if another first intersection is absent, it is checked if the destination intersection DSP has linked up (step 301). Since the destination intersection DSP has not linked up, the value i is incremented to 2 (step 311). Control is then passed to step 302. The aforesaid processing is repeated.

As mentioned above, when the orientation of a route leading to a certain adjacent intersection from the i-th intersection deviates by the value c from the direction to a destination relative to a departure point, the route is trimmed away and exploration does not proceed. An unnecessary route will therefore not be explored. Although a destination has not linked up, when a total distance exceeds the value $L_{LMT}$, exploration will not proceed any longer. A route deviating from the destination will therefore not be explored.

Since the destination intersection DSP is included in all the intersections regarded as the (i+1)-th intersections, when the result of the check at step 310 is in the affirmative, the destination intersection DSP, the (m−1)-th intersection registered as item (25) in FIG. 2 in the intersection network list CRNL for the destination intersection DSP (m-th intersection), the (m−2)-th intersection registered in the intersection network list CRNL for the (m−1)-th intersection, etc., the first intersection stored in the intersection network list for the second intersection, and the zero-order intersection or departure point intersection STP stored in the intersection network list CRNL for the first intersection are linked one after another in the order that starts with the departure point and ends with the destination. The resultant route is determined as the shortest route (step 315).

A node array forming the shortest route is stored as guidance route data in the guidance route memory 15j. Route exploration is then terminated (step 316).

Route Exploration (Suburban District)—Horizontal Technique

Figure 23:
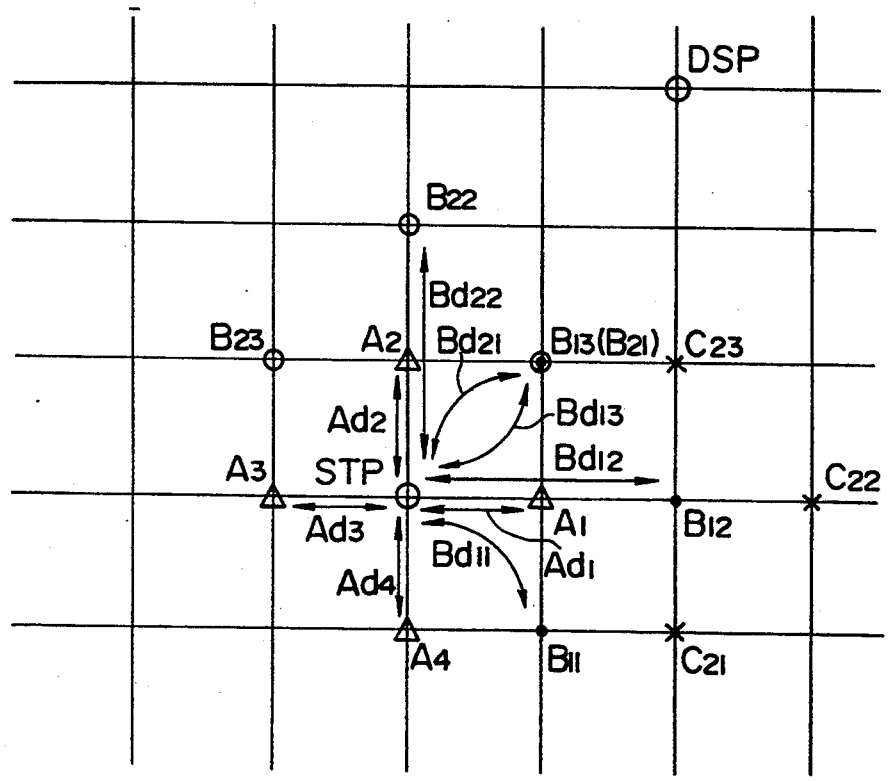
FIG. 23 shows a route exploration method based on the horizontal exploration technique.

In contrast, when the density of intersections is low and the suburban district is identified at step 209 in FIG. 4, the optimal route explorer 15g explores an optimal route linking a departure point and a destination using intersection network lists according to the conventional non-heuristic horizontal exploration technique (See FIG. 23).

When the density of intersections is low, the density of roads is low. A major detour must sometimes therefore be made to reach a destination.

Figure 6:
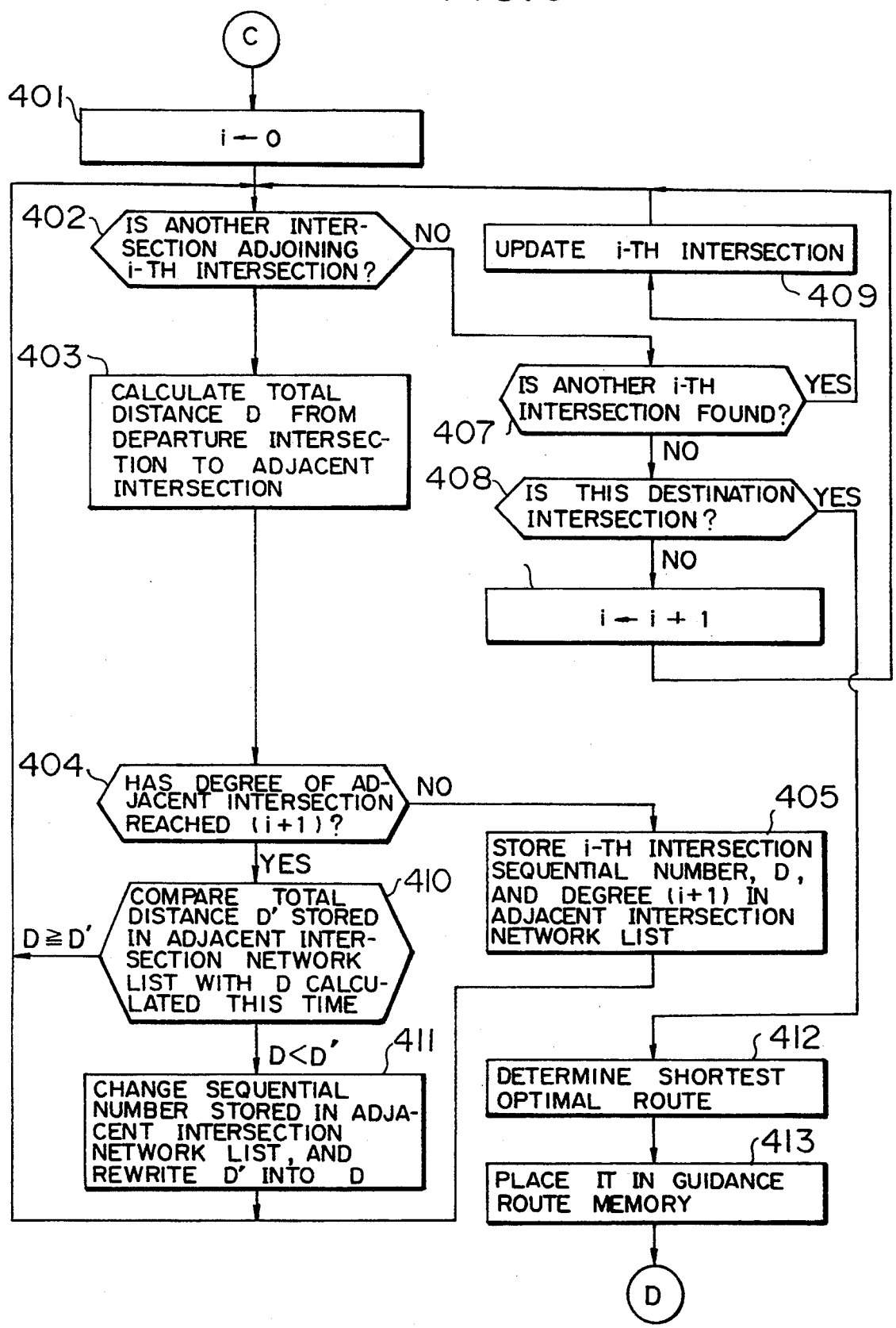

The optimal route explorer 1g passes control to step 401 in FIG. 6. First, the retrieval degree is set to zero. The intersection network list CRNL for a departure point intersection STP is referenced to see if another intersection adjoins the zero-order intersection (departure point intersection, step 402).

An intersection $A_1$ is adjoining. A total distance D from the departure point intersection STP to the adjacent intersection $A_1$ is then calculated (step 403). The D value is provided according to the following expression:

$$d_1 + d_2 = D$$

where, $d_1$ denotes a total distance from the departure intersection STP to the i-th intersection and $d_2$ denotes a distance from the i-th intersection to the adjacent intersection $A_1$. When i represents zero, the value $d_1$ is zero. The D value is therefore equal to the $d_2$ value. The $d_2$ value is registered as item (26) in FIG. 2 in the intersection network list CRNL for the departure point intersection STP.

Next, the intersection network list CRNL for the adjacent intersection $A_1$ is referenced to check if a total length of a different route leading to the intersection A and information specifying a preceding intersection (intersection sequential number) of the intersection $A_1$ have already been registered as items (25) and following in FIG. 2 (step 404). Since the result of the check is in the negative, the data listed below are stored as items (25) to (27) in FIG. 2 in the intersection network list CRNL for the adjacent intersection $A_1$ (step 405):

(A) Intersection sequential number of the zero-order intersection STP concerned;
(B) Total distance from the zero-order intersection STP to the adjacent intersection $A_1$;
(C) (i+1)=1 as a retrieval degree of the adjacent intersect i on $A_1$.

Control is then returned to step 402. The intersection network list CRNL for the departure point intersection STP is referenced to see if another intersection adjoins the zero-order intersection concerned. If another intersection is adjoining, the foregoing processing is repeated.

As a result, the adjacent intersections $A_1$ to $A_4$ reside in the intersection network list for the departure point intersection STP. All of the intersections are regarded as the first intersections. An intersection sequential number of a preceding intersection (here, the departure point intersection STP), a total distance from the departure point that is any of the values $Ad_1$ to $Ad_4$, and a retrieval degree 1 are registered in each of the associated intersection network lists CRNL.

Upon completing processing all adjacent intersections contained in the intersection network list CRNL for the departure point intersection STP, the optimal route explorer 15g determines whether another zero-order intersection is present aside from the departure point intersection STP (step 406). Since another zero-order intersection is absent, it is determined whether the destination intersection DSP has linked up (step 407). If the destination intersection DSP has not linked up, the value i is incremented to 1 (step 408).

When one of the first intersections, for example, $A_1$ is concerned, the intersection network list for the intersection $A_1$ stored in the route exploration memory 15i is referenced to determine whether another adjacent intersection are present aside from the intersections regarded as the zero-order and first intersections (step 402). Intersections $B_{11}$, $B_{12}$, and $B_{13}$ are present. The intersection network list for the intersection $A_1$ is referenced to calculate the total distance D of a route linking the departure point intersection STP, the first intersection $A_1$ concerned, and one of the adjacent intersections, for example, $B_{11}$ (step 403). The total distance $d_1$ (=$Ad_1$) from the departure point intersection STP to the first intersection $A_1$ concerned, and the distance $d_2$ from the first intersection $A_1$ to the adjacent intersection $B_{11}$ are stored as items (26), and (11), (13), or (15) in FIG. 2 in the intersection network list CRNL for the intersection $A_1$. The total distance D from the departure point intersection STP to the adjacent intersection $B_{11}$ is therefore calculated according to the expression below.

$$d_1 + d_2 = D$$

The intersection network list CRNL for the adjacent intersection $B_{11}$ is referenced to check if a retrieval degree registered as item (27) in FIG. 2 is (i+1)=2 (step 304). Since the result of the check is in the negative, the data listed below are stored as items (25) to (27) in FIG. 2 in the intersection network list CRNL for the adjacent intersection $B_{11}$ (step 405):

(A) Intersection sequential number of the first intersection $A_1$ concerned;

(B) Total distance from the departure point to the adjacent intersection $B_{11}$;

(C) (i+1)=2 as a retrieval degree of the adjacent intersection $B_{11}$.

Control is then returned to step 402. If a subsequent adjacent intersection is present relative to the first intersection $A_1$, the foregoing processing is repeated.

Since adjacent intersections $B_{12}$ and $B_{13}$ reside in the intersection network list for the intersection $A_1$, the total distances D from the departure point intersection STP to the adjacent intersections $B_{12}$ and $B_{13}$ are calculated and registered together with the intersection sequential number of the first intersection $A_1$ and the retrieval degree (ill) in the intersection network lists for the adjacent intersections $B_{12}$ and $B_{13}$ (steps 402 to 403) control is then returned to the step 402.

As a result, the adjacent intersections $B_{11}$, $B_{12}$, and $B_{13}$ adjoin the first intersection $A_1$. The intersection sequential number of the preceding intersection, the total distance from the departure point that is any of values $Bd_{11}$, $Bd_{12}$, and $Bd_{13}$, and the retrieval degree 2 are registered in each of the associated intersection network lists CRNL.

When completing processing all the adjacent intersections contained in the intersection network list for the intersection $A_1$, the optimal route explorer 15g determines whether another first intersection is present aside from the intersection $A_1$ (step 406). Since an intersection $A_2$ is present, it is regarded as a new first intersection (step 409). The processing of the step 402 and later is then repeated. Adjacent intersections $B_{21}$ to $B_{23}$ reside aside from the departure point intersection in the intersection network list for the intersection $A_2$. The adjacent intersections are handled in the same manner as the intersection $A_1$.

As for the intersection $B_{21}$, since the intersections $B_{21}$ and $B_{13}$ are mutually duplicative and the degree of the adjacent intersection $B_{13}$ is 2, the result of the operation at the step 404 is in the affirmative. This means that the adjacent intersection $B_{21}$ has already been processed as the intersection $B_{13}$ adjoining the first intersection $A_1$ (the aforesaid data (A) to (C) have already been stored). In this case, the total distance D calculated at step 403 is compared with the total distance D', which has a value $Bd_{13}$, from the departure point intersection STP registered in the intersection network list CRNL for the adjacent intersection $B_{13}$ (step 410).

If the D value is smaller than the D' value, the intersection sequential number of the i-th intersection A registered as item (25) in FIG. 2 in the intersection network list CRNL for the adjacent intersection $B_{13}$ (=$B_{21}$) is updated with the intersection sequential number of the ith intersection $A_2$ concerned. The total distance D' registered as item (26) in FIG. 2 therein is updated with the total distance D that has the value $Bd_{21}$ (step 411). Control is then returned to the step 402. When the D value is equal to or larger than the D' value, the contents of items (25) to (27) in FIG. 2 in the intersection network list CRNL for the intersection $B_{13}$ (=$B_{21}$) will not be modified. Control is then returned to the step 402.

When the specified processing has been completed for the adjacent intersections of the intersection $A_2$, intersections $A_3$ and $A_4$ are handled similarly. When another first intersection comes to be absent, it is checked if the destination intersection DSP has linked up (step 407). Since the destination intersection DSP has not linked up, the value i is incremented to 2 (step 408). Control is then passed to step 402. The aforesaid processing is repeated.

When the destination intersection DSP is included in the intersections regarded as the (i+1)-th intersections, if the result of the check at step 407 is in the affirmative, the destination intersection DSP, the (m−1)-th intersection registered as item (27) in FIG. 2 in the intersection network list CRNL for the destination intersection DSP (m-th intersection), the (m−2)-th intersection registered in the intersection network list CRNL for the (m−1)-th intersection, etc., the first intersection registered in the intersection network list CRNL for the second intersection, and the zero-order intersection or departure point intersection STP registered in the intersection network list CRNL for the first intersection are linked one after another in an order that starts with the departure point and ends with the destination. The shortest route is thus determined (step 412).

A node array forming the shortest route is stored as guidance route data in the guidance route memory 15j. Route exploration is then terminated (step 413).

Even when the destination DSP has linked up with a certain route, as long as another route has a total length that is shorter than the total distance registered in the intersection network list for the destination intersection, route exploration continues. When the destination DSP has linked up with another route, if the total distance (length) of the route is shorter than the one registered in the intersection network list for the destination intersection, the value registered in the intersection network list is updated/Thereafter, when the total distances of all the other routes are longer than the one registered in the intersection network list for the destination intersection, route exploration may be terminated.

Guidance route data is composed of intersections alone (including simple nodes serving as adjacent nodes). The intersection network lists, road list RDLT of road data, and node table NDTB may be referenced to interpolate intersections with simple nodes. The resultant detailed route guidance data may then be stored in the guidance route memory 15j.

Furthermore, a node array explored by performing route exploration in the direction of a departure point relative to a destination may be arranged in reverse order and then provided as guidance route data.

Route Guidance

Figure 7:
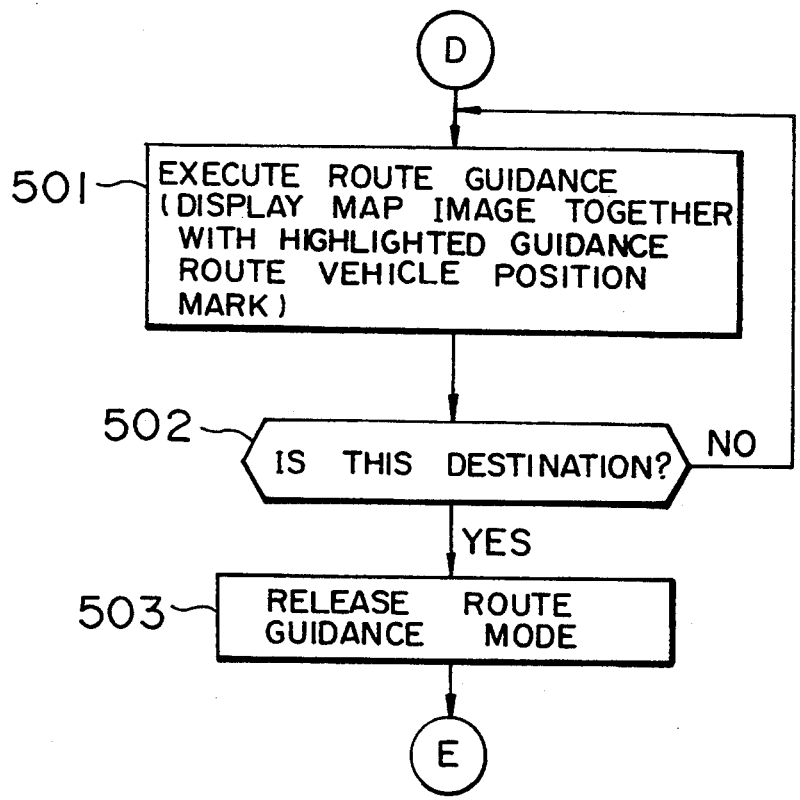
Figure 8:
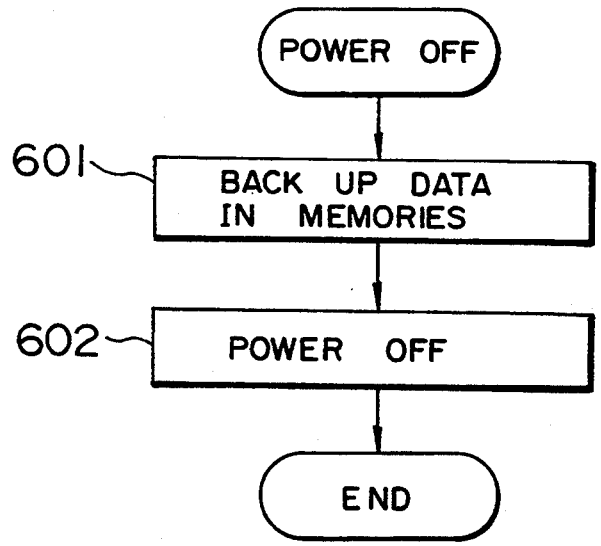

The map display control unit 15 displays route guidance images for a driver until a destination links up (step 501 in FIG. 7). Specifically, the map image drawer 15a receives vehicle location data from the vehicle location detector 13, references drawing management information, and reads map data, which defines nine quarter drawings showing the location of a vehicle and the surrounding areas, from the CD ROM 11 into the buffer memory 15b. In the meantime, the map image drawer 15a produces the map images for nine screens in the video RAM 15d. The guidance route drawer 15c receives the display area information of the video RAM 15d from the map image drawer 15a, fetches the portion of guidance route data defining the display area produced in the video RAM 15d from the guidance route memory 15j, and produces a guidance route highlighted with a boldfaced line in a specified color in the video RAM 15d.

With the variation in the location of a vehicle due to the travel of the vehicle, the map image drawer 15a receives vehicle location data from the vehicle location detector 13 and allows the read controller 15e to read an image, which is centered on the location of the vehicle and constructs one screen, from the video RAM 15d.

When an image, which is centered on the location of the vehicle and constructs one screen, disagrees with any of the map images produced in the video RAM 15d because of the variation in the location of the vehicle, the map image drawer 15a reads new map data related to the location of the own vehicle and the surrounding areas from the CD ROM 11 and draws the map images for nine screens, which show the location of the own vehicle and the surrounding areas, in the video RAM 15d.

The vehicle location mark generator 15f receives vehicle azimuth data from the vehicle location detector 13 and generates a vehicle location mark oriented in the direction specified in the data. The synthesizer 15k superposes the vehicle location mark on the central part of the image read by the read controller 15e, and outputs the resultant image to the display unit 12. The map image showing the location of a vehicle and the surrounding areas is thus displayed together with the vehicle location mark, wherein a highlighted guidance route is also displayed.

A driver can reach a destination effortlessly merely by driving along the guidance route displayed on the screen. When the destination has linked up, the map display control unit 15 releases the route guidance mode and switches it into the normal guide mode (steps 502 and 503).

In the normal guide mode, a normal map image is displayed. More particularly, the map image drawer 15a receives vehicle location data from the vehicle location detector 13, reads map data defining an upper-layer drawing, which contains the location of the vehicle, from the CD ROM 11 into the buffer memory 15b, and produces the images in the video RAM 15d. Under the read control of the map image drawer 15a, the read controller 15e cuts out the map image, which is centered on the location of the vehicle and constructs one screen from the map images produced in the video RAM 15d. The vehicle location mark generator 15f generates a specified vehicle location mark, and outputs it to the synthesizer 15k. The synthesizer 15k superposes the vehicle location mark on the map image not containing a highlighted guidance route, and outputs the resultant image to the display unit 2. The normal map image is thus displayed together with the vehicle location mark in a screen (step 103 in FIG. 3).

When the power supply of the on-vehicle navigator is turned off because, for example, the driver takes a break, the route exploration memory 15i and guidance route memory 15j are backed up by batteries. The data contained in the memories are thus preserved even when the power supply is off. When the power supply is next turned on, the state established immediately before the power supply is turned off can be re-set. Thereafter, specified power off is executed (steps 601 and 602 in FIG. 8).

According to this embodiment, before route exploration is started, it is determined whether an exploration object zone lies in an urban or suburban district. When the exploration object zone lies in an urban district, it is checked if the azimuth of a route leading to an adjacent intersection from the i-th intersection is deviating by more than a value $\theta_c$ from the azimuth of a destination with respect to the departure point. If the azimuth of the route is so deviating, the route is trimmed away so that route exploration does not proceed with the route any longer. Unnecessary routes are therefore not explored. When the destination has not linked up, if a total distance exceeds a value $L_{LMT}$, route exploration does not proceed any longer. Routes deviating from the destination are therefore not be explored. The heuristic exploration results in quick exploration of an optimal route in an urban district. In other words, according to the heuristic exploration, exploration is executed exclusively for routes approaching a destination within a route exploration object zone ($BU_{11}$ to $BU_{33}$).

In an urban district, the density of roads is high. Heuristic exploration will therefore not result in failure to find an optimal route leading to a destination.

When an exploration object zone lies in a suburban district, normal non-heuristic horizontal exploration is executed. Even when the density of roads is low and detours alone lead to a destination, since the predetermined route exploration object zone ($BU_{11}$ to $BU_{33}$) is explored meticulously (exhaustively), an optimal route linking a departure point and a destination can be explored reliably.

In the aforesaid embodiment, the azimuth $\theta$ of a route leading to a certain adjacent intersection from the i-th intersection is calculated using the coordinates of the i-th intersection and adjacent intersection. It is then checked if the absolute value of a difference from a value $\theta_0$ is equal to or smaller than a value $\theta_c$ whereby it is determined whether the route is to be trimmed away. For a simpler calculation, the procedure described below may be adopted.

Difference coordinates (X, Y) representing a longitude and a latitude of each adjacent intersection, which are specified in a difference coordinate system whose origin is set at an object intersection of an intersection network list, are registered in each intersection network list (See FIG. 12).

At step 211 in FIG. 4, the azimuth $\theta_0$ of a destination with respect to a departure point is not calculated, but it is deduced in which quadrant the destination intersection resides in terms of a difference coordinate system whose origin is set at the departure intersection.

Figure 13A:
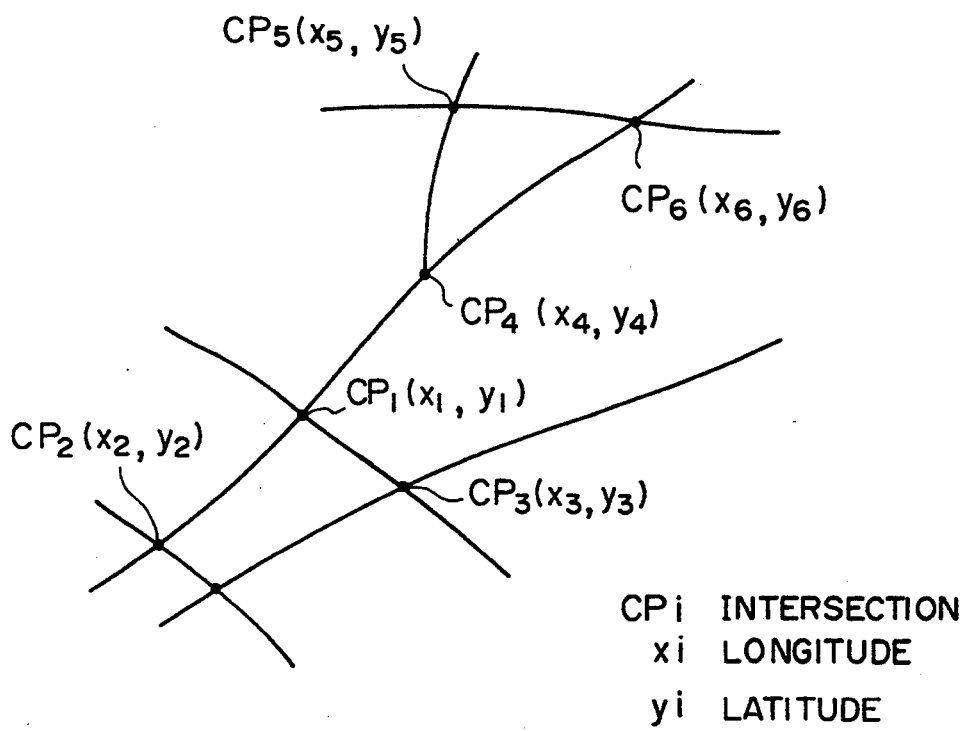
FIGS. 13a, 13b shows difference coordinates.
Figure 13B:
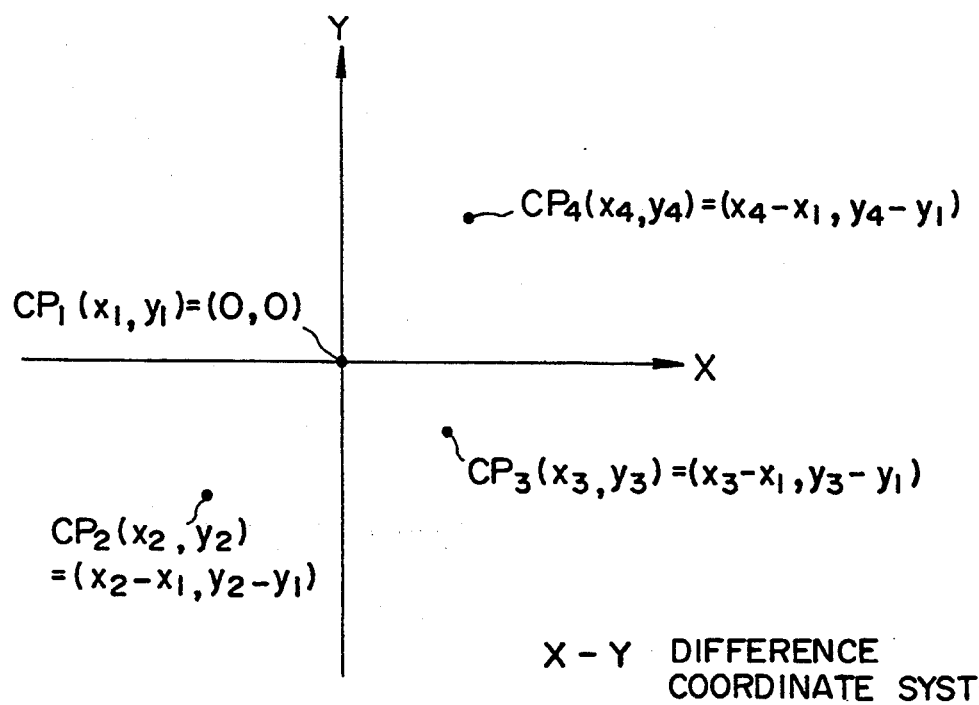

Item (12) in FIG. 12 specifying difference coordinates is described below. Assuming that road data defines roads as shown in FIG. 13(1), the position coordinates (longitude, latitude) of an intersection $CP_1$ for which an intersection network list is to be created is (x1, y1), the position coordinates of adjacent intersections $CP_2$ to $CP_4$ adjoining the intersection $CP_1$ are (xz, y2) to (X4, y4). Difference coordinates (X2, Y2) to (X4, Y4) of the adjacent intersections $CP_2$ to $CP_4$ are provided as the equations that follow in the difference coordinate system X-Y shown in FIG. 13(a):

$$(X_2, Y_2) = (x_2 - x_1, y_2 - y_1)$$

$$(X_3, Y_3) = (x_3 - x_1, y_3 - y_1)$$

$$(X_4, Y_4) = (x_4 - x_1, y_4 - y_1)$$

The difference coordinates of the adjacent intersections $CP_2$ to $CP_4$ correspond to the position coordinates representing relative longitudes (x axis) and latitudes (y axis) of the adjacent intersections $CP_2$ to $CP_4$ with respect to the intersection $CP_1$ concerned.

If an object intersection of an intersection network list is $CP_4$, the difference coordinates of the adjacent intersections $CP_1$, $CP_5$ and $CP_6$ are expressed as follows:

$$(X_1, Y_1) = (x_1 - x_4, y_1 - y_4)$$

$$(X_5, Y_5) = (x_5 - x_4, y_5 - y_4)$$

$$(X_6, Y_6) = (x_6 - x_4, y_6 - y_4)$$

The same applies to an intersection network list for any other intersection.

Figure 14:
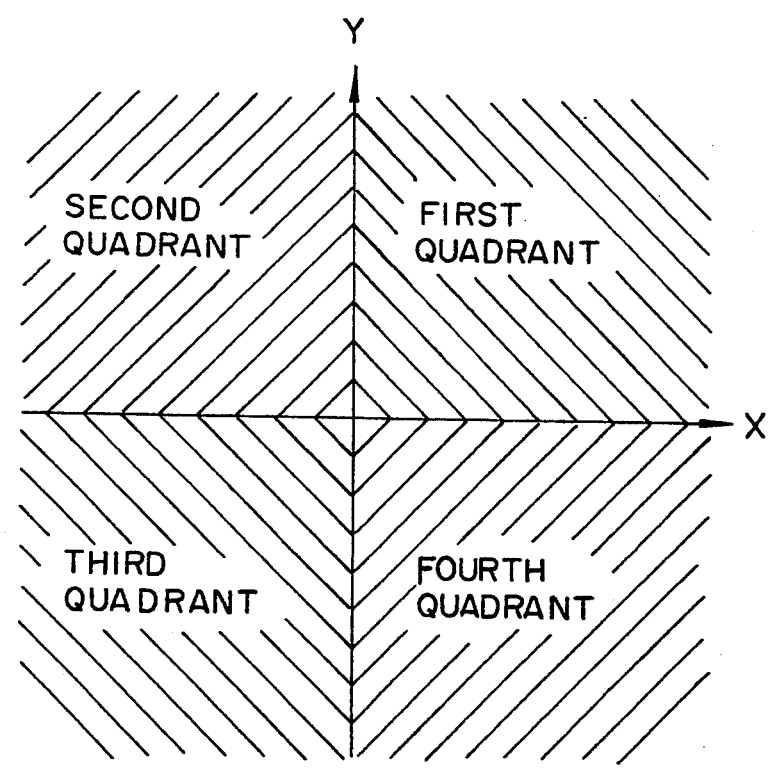
FIG. 14 shows quadrants in an X-Y difference coordinate system.

How to deduce in which quadrant a destination intersection DSP resides will be described below. Quadrants in the difference coordinate system X-Y are defined as shown in FIG. 14 by the formulas as follows:

| | |
|---|---|
| $X > 0$ and $Y \geq 0$ | First quadrant |
| $X \leq 0$ and $Y > 0$ | Second quadrant |
| $X < 0$ and $Y \leq 0$ | Third quadrant |
| $X \geq 0$ and $Y > 0$ | Fourth quadrant |

Assuming that the longitudinal and latitudinal coordinates of a departure intersection are ($X_{STP}$, $Y_{STP}$) and the longitudinal and latitudinal coordinates of a destination intersection are ($X_{DSP}$, $Y_{DSP}$) the above formulas are rewritten as follows:

| | |
|---|---|
| $x_{DSP} - x_{STP} > 0$ and $y_{DSP} - y_{STP} \geq 0$ | First quadrant |
| $x_{DSP} - x_{STP} \leq 0$ and $y_{DSP} - y_{STP} > 0$ | Second quadrant |
| $x_{SSP} - x_{STP} < 0$ and $y_{DSP} - y_{STP} \leq 0$ | Third quadrant |
| $x_{DSP} - x_{STP} \geq 0$ and $y_{DSP} - y_{STP} < 0$ | Fourth quadrant |

Based on these formulas, the quadrant of the destination intersection DSP is deduced. The destination intersection DSP in FIG. 10 resides in the first quadrant.

Figure 5:
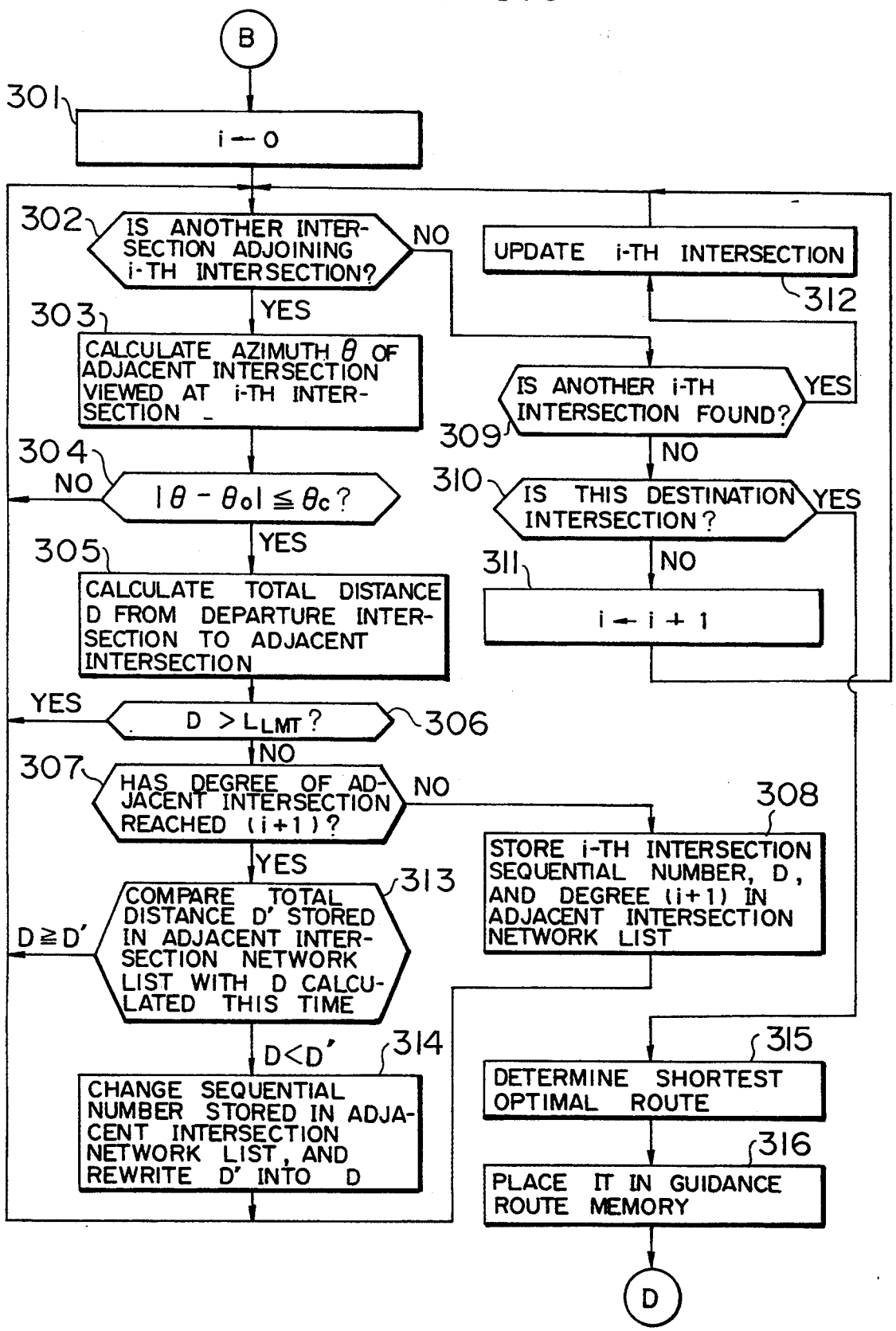

At steps 303 and 304 in FIG. 5, azimuths are not compared. Instead of the comparison, first, the intersection network list for the i-th intersection concerned is referenced to retrieve difference coordinates of one of adjacent intersections registered therein. Based on the difference coordinates, it is deduced in which quadrant the adjacent intersection resides in terms of a difference coordinate system whose origin is set at the i-th intersection. Instead of the operation at step 211 in FIG. 4, it is determined whether the quadrant agrees with the quadrant of a destination. If the quadrants agree with each other, the processing of step 305 and later is carried out. If the quadrants disagree with each other, control is returned to step 302. Trimming is then executed (See FIG. 15(1)).

For example, when an intersection is a departure point intersection and an adjacent intersection is $A_1$, the intersection $A_1$ resides in the fourth quadrant of a difference coordinate system whose origin is set at the departure point intersection. Thus, the quadrant of the intersection $A_1$ disagrees with the quadrant of a destination intersection; that is, the first quadrant. Trimming is therefore executed. When it comes to an adjacent intersection $A_2$, the quadrants agree with each other. Trimming is therefore not executed, but control is passed beyond step 305. A total distance, an intersection sequential number of a preceding intersection, and a retrieval degree are stored. As for intersections $A_3$ and $A_4$, since their quadrants disagree with the one of the destination intersection, control is returned to step 302 and trimming is executed.

As mentioned above, difference coordinates of adjacent intersections in a different coordinate system whose origin is set at an object intersection are stored in an intersection network list. At the start of retrieval, it is deduced in which quadrant a destination intersection resides in terms of a difference coordinate system whose origin is set at a departure point intersection. During route exploration, when it is determined whether a route linking the i-th intersection and a certain adjacent intersection adjoining the i-th intersection should be trimmed away, the intersection network list for the i-th intersection concerned is referenced to retrieve difference coordinates of the adjacent intersection. It is then determined whether the quadrant of the adjacent intersection agrees with the one of the destination intersection. This procedure obviates the necessity of calculating an azimuth using a trigonometric function. Consequently, an optimal route is further explored quickly.

Figure 15A:
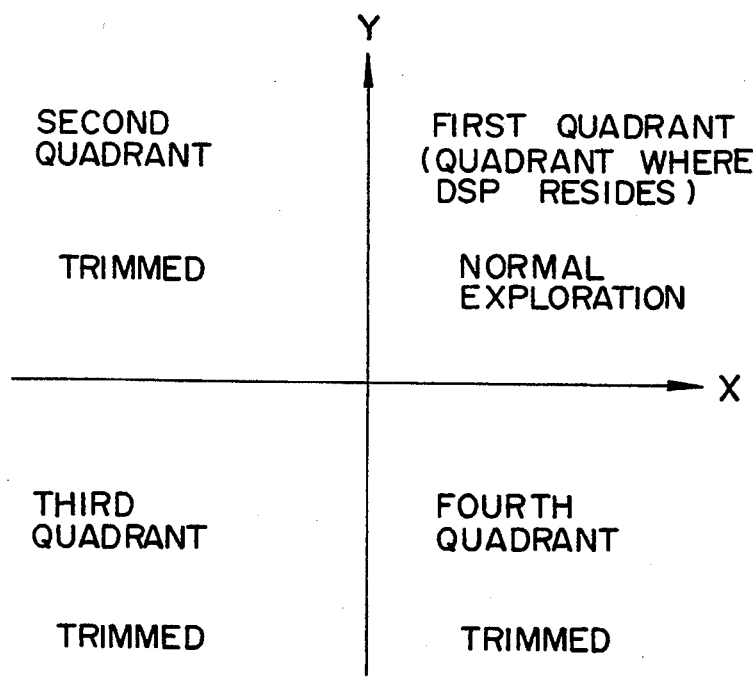
FIGS. 15a, 15b show trimming relating to a variant of the present invention.
Figure 15B:
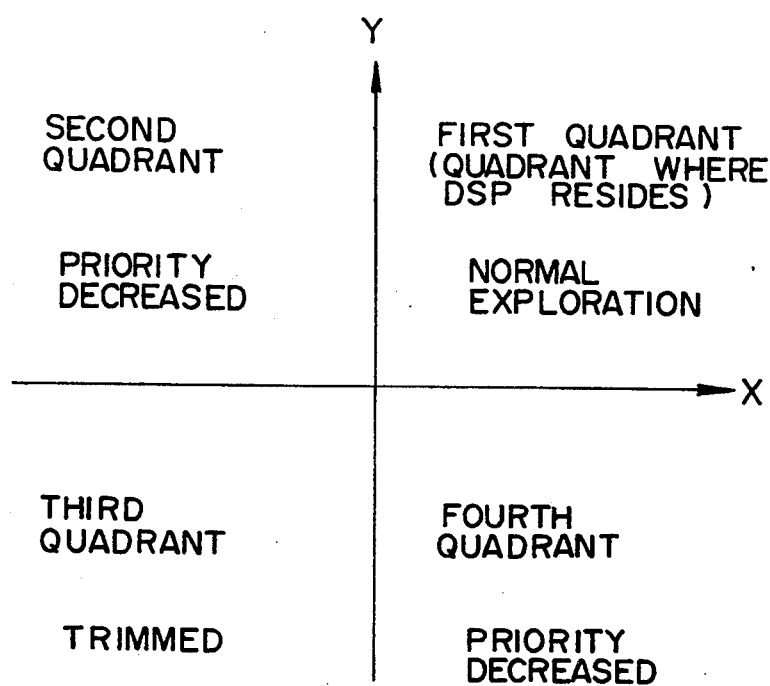

When difference coordinates are employed, as shown in FIG. 15(2), it may be determined whether the quadrant of a certain adjacent intersection of the i-th intersection concerned is the fourth quadrant that is opposed to the one of a destination intersection (herein, the first quadrant). When the quadrant of the adjacent intersection is the fourth quadrant, trimming may executed. When the quadrant: of the adjacent intersection is the second or third quadrant next to the first quadrant, trimming may not be executed. When a total distance from a departure point is calculated at the step 305 in FIG. 5, the value of the distance $d_2$ between the i-th intersection concerned and the adjacent intersection, which is stored in the intersection network list for the i-th intersection, may be weighted by multiplying it by k (k>1), and the multiplied value may be added to a value registered as the total distance from the departure point to the i-th intersection in the intersection network list for the i-th intersection. This is intended to lower the priority of the route linking the i-th intersection and the adjacent intersection.

In the aforesaid embodiment, intersection network lists are created using map data stored in the CD ROM by the map display control unit. Alternatively, intersection network lists that have been crated may be pre-stored in the data units of map data, so that a required intersection network list can be read from the CD ROM for use. Furthermore, the value $\theta_c$ is not limited to 67.5° but may be, for example, 45°.

Exploration may be performed according to the Dijkstra technique instead of the horizontal exploration technique.

Figure 16:
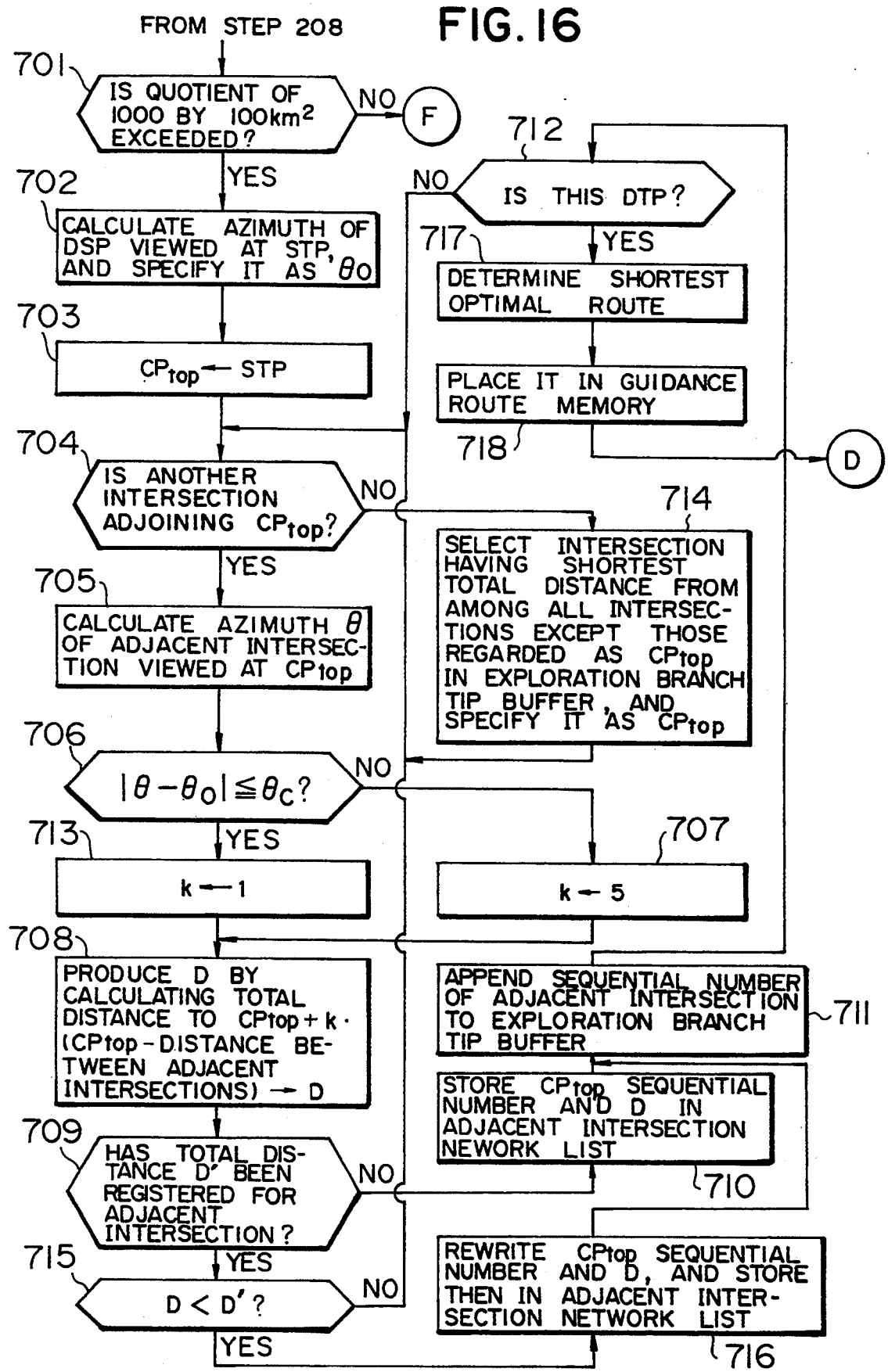
FIGS. 16 and 17 are flowcharts showing route exploration based on a Dijkstra technique.
Figure 17:
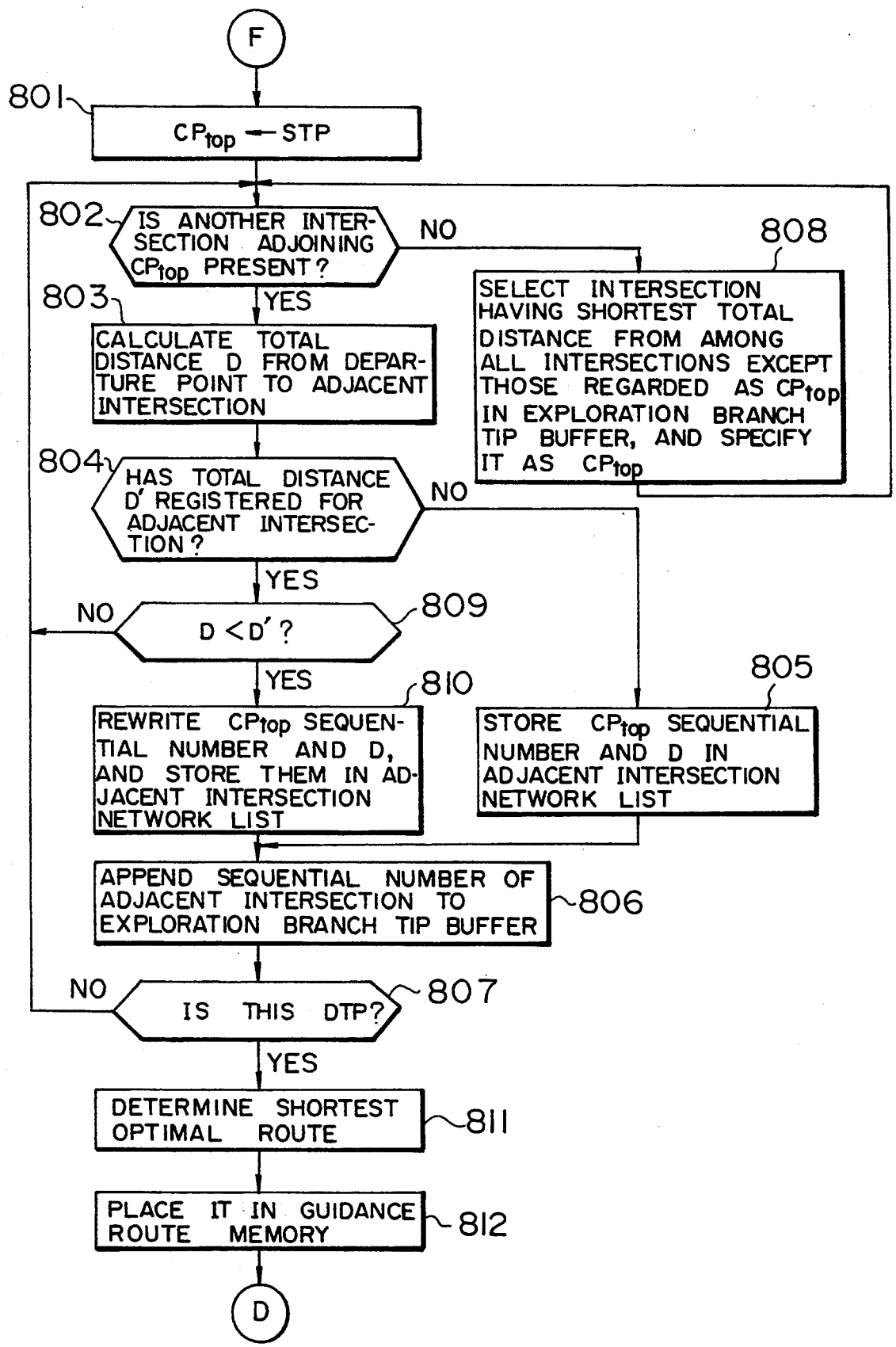
Figure 18A:
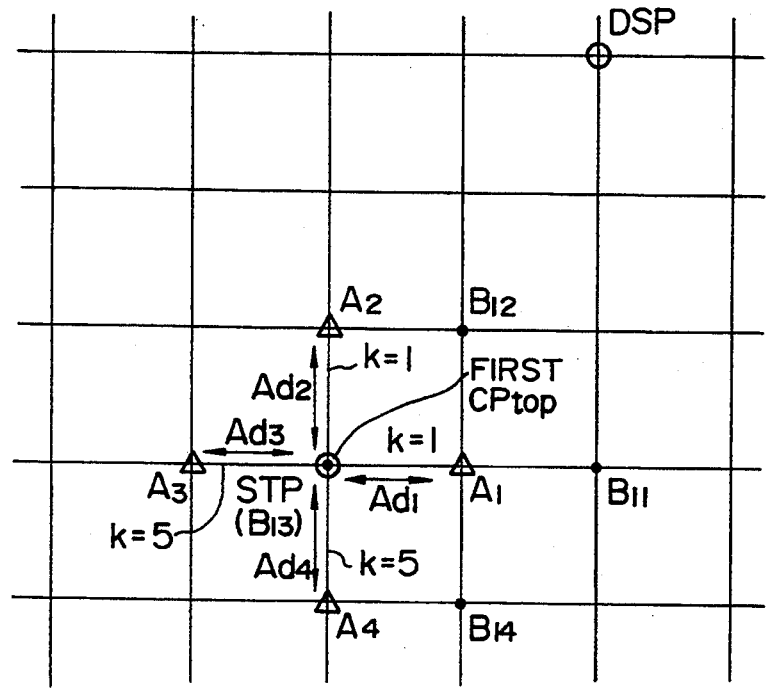
FIGS. 18a, 18b show the Dijkstra technique.
Figure 18B:
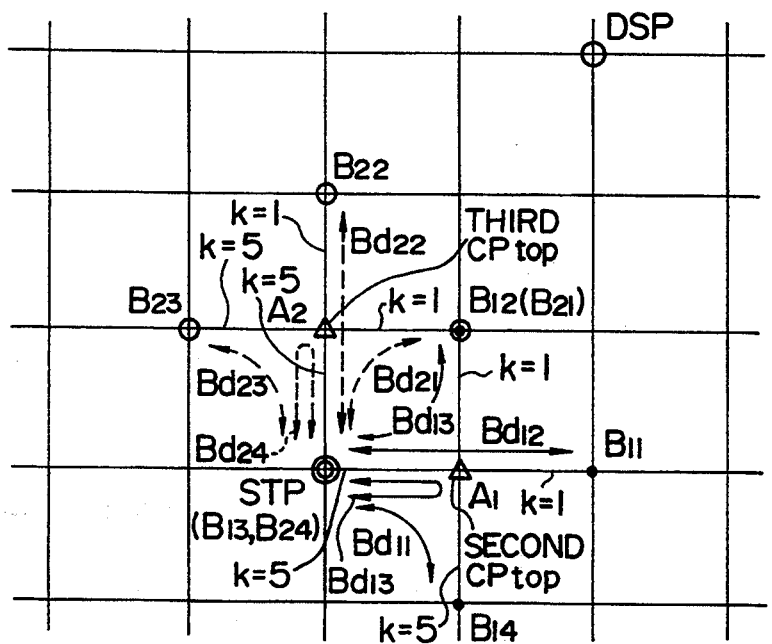

FIGS. 16 and 17 are flowcharts showing the optimal route exploration based on the Dijkstra technique by the optimal route explorer 15g. FIGS. 18a, 18b are a schematic explanatory diagram showing the Dijkstra technique. The description below proceeds in conjunction with these drawings. FIG. 16 shows the steps 209 and later in FIG. 4 and the steps ending with D in FIG. 7. An intersection network list shall be identical to the one in FIG. 2 (however, item (27) specifying a retrieval degree is excluded).

Route Exploration (Urban District)—Heuristic Dikstra Technique

According to the Dijkstra technique, when the area determiner 15h determines that an exploration object zone lies in an urban district (step 208 in FIG. 4 or step 701 in FIG. 16), the optimal route explorer 15g calculates an azimuth $\theta_0$ destination intersection DSP with respect to a departure point intersection STP (step 702). The departure point intersection STP is regarded as the first exploration branch tip node $CP_{top}$. Zero is then specified as a total distance in the intersection network list for the departure point intersection STP (step 703) (See FIG. 18(a)). The intersection network list for the $CP_{top}$ (=STP) node is referenced to see if another adjacent intersection adjoins the $CP_{top}$ node (step 704). Intersections $A_1$ to $A_4$ are adjoining. The azimuth $\theta$ of one of them, $A_4$, with respect to the $CP_{top}$ node is then calculated (step 705). It is checked if the absolute value of a difference from the azimuth $\theta_0$ of the destination intersection with respect to the departure point intersection STP is equal to or smaller than a certain value $\theta_c$ (herein, 67.5°); that is, if a route leading to the adjacent intersection from the $CP_{top}$ node is oriented in the direction of the destination intersection DSP relative to the departure point intersection STP (step 706).

When the result of the check at the step 706 is in the affirmative, the optimal route explorer 15g sets 1 as a weighting factor k for a route linking the current $CP_{top}$ node to the adjacent intersection $A_1$ because the route does not largely deviate from the direction to the destination intersection (step 713). When the result of the check at step 706 is in the negative, 5 is set as the weighting factor k because the route deviates from the direction to the destination intersection (step 705). For the intersection $A_4$, 5 is set as a k value (step 707).

The total distance $d_1$ from the departure point intersection STP to the $CP_{top}$ node and a distance $d_2$ from the $CP_{top}$ node to the adjacent intersection $A_4$ are summed up to calculate a value $Ad_4$ as a total distance from the departure point intersection to the adjacent intersection $A_4$, which is represented as the following expression (step 708):

$$d_1 + kd_2 = Ad_4$$

The $d_1$ value is registered as a total distance in the intersection network list for the $CP_{top}$ node. The $d_2$ value is registered as a distance to the adjacent intersection $A_4$ in the intersection network list for the $CP_{top}$ node.

Next, it is checked if the total distance D' has been registered in the intersection network list for the intersection $A_4$ (step 709). Since the total distance D' has not been registered, the total distance D' is registered together with an intersection sequential number specifying a preceding intersection (current $CP_{top}$ node) in the intersection network list for the adjacent intersection $A_4$ (step 710, items (25) and (26) in the intersection network list in FIG. 2). An intersection sequential number of the adjacent intersection $A_4$ is registered in the exploration branch tip buffer in the route exploration memory 15i (step 711). It is then checked if the destination has linked up; that is, this adjacent intersection $A_4$ agrees with the destination intersection (step 712).

Since the destination has not linked up, control is returned to the step 704. It is then checked if another adjacent intersection adjoins the current $CP_{top}$ node. Intersections $A_1$, $A_3$, and $A_4$ are adjoining. The azimuth of one of them, $A_1$, with respect to $CP_{top}$ is calculated. It is then checked if the absolute value of a difference from the value $\theta_0$ is equal to or smaller than the value $\theta_c$ (steps 705 and 706). The result of the check at the step 712 is in the affirmative. 1 is then set as a k value (step 713). A value $Ad_1$ is calculated as a total distance from the departure intersection STP according to the following expression:

$$d_1 + kd_2 = Ad_1$$

Since a total distance has not been stored in the intersection network list for the intersection $A_1$, the calculated value is registered together with the intersection sequential number of the $CP_{top}$ node (preceding intersection) in the intersection network list for the intersection $A_1$. The intersection sequential number of the intersection $A_1$ is appended to the exploration branch tip buffer (steps 709 to 711). It is then checked, if the destination has linked up (step 712). Since the destination has not been linked up, control is returned to the step 704. The aforesaid processing is then repeated.

Since the absolute value of a difference between the azimuth $\theta$ of an adjacent intersection $A_2$ and the value $\theta_0$ is equal to or smaller than the value $\theta_c$, k=1 is set. A value $Ad_2$ is then calculated as a total distance (steps 705, 706, 713, and 708). Since the absolute value of a difference between the azimuth $\theta$ of an adjacent intersection $A_3$ and the value $\theta$ exceeds the value $6c$, k=5 is set. A total distance $Ad_2$ is then calculated. The calculated total distances are then stored together with the intersection sequential number of the $CP_{top}$ node in the intersection network lists for the intersections $A_2$ and $A_3$ respectively (steps 709 and 710). The intersection sequential numbers of the intersection $A_2$ and $A_3$ are then appended to the exploration branch tip buffer (step 711).

When any other intersection does not adjoin the $CP_{top}$ node that is the departure point intersection STP, an intersection having the shortest total distance is selected from among all the intersections stored in the exploration branch tip buffer except those regarded as $CP_{top}$ nodes. The selected intersection is regarded as a new $CP_{top}$ node (steps 704 and 714, see the solid line in FIG. 18($b$)). Intersections $A_1$ to $A_4$ are registered in the exploration branch tip buffer. Since 5 is specified in k, $Ad_3$ and $Ad_4$ assume large values. This lowers the priorities of the associated intersections. Since 1 is specified in k, $Ad_1$ and $Ad_2$ assume smaller values. This increase the priorities of the associated intersections. If the value $Ad_1$ is the smallest, the intersection $A_1$ is regarded as a $CP_{top}$ node.

The intersection network list for the intersection A is then referenced. For one of adjacent intersections adjoining the intersection $A_1$, $B_{14}$, the azimuth $\theta$ with respect to the updated $CP_{top}$ node is calculated. It is then checked if the absolute value of a difference from the azimuth of the destination $\theta_0$ with respect to the departure point intersection STP is equal to or smaller than a certain value $\theta_c$ (steps 704 to 706). Since the result of the check is in the negative, 5 is specified for k (step 707).

The total distance $d_1$ from the departure intersection STP to the $CP_{top}$ node and a distance $d_2$ from the $CP_{top}$ node to the adjacent intersection $B_{14}$ are summed up to calculate a value $Bd_{14}$ as a total distance from the departure intersection to the adjacent intersection $B_{14}$, which is represented as the following expression (step 708):

$$d_1 + kd_2 = Bd_{14}$$

The $d_1$ value is registered as a total distance in the intersection network list for the $CP_{top}$ node. The $d_2$ value is stored as a distance to the adjacent intersection $B_{14}$ in the intersection network list for the $CP_{top}$ nod.

It is then checked if the total distance $D'$ has already been registered in the intersection network list for the intersection $B_{14}$ (step 709). Since no value has been stored, the calculated value $Bd_{14}$ is registered together with an intersection sequential number of a preceding intersection (current $CP_{top}$ node or intersection $A_1$) in the intersection network list for the intersection $B_{14}$ (step 710) (items (25) and (26) in the intersection network list in FIG. 2). Next, an intersection sequential number of the adjacent intersection $B_{14}$ is stored in the exploration branch tip buffer (step 711).

It is then checked if the destination has linked up (step 712). If the destination has not linked up, control is returned to step 704. It is then checked if another adjacent intersection adjoins the current $CP_{top}$ node. Intersections $B_{11}$ to $B_{13}$ adjoin the $CP_{top}$ node. The azimuth of one of them, $B_{11}$, with respect to the $CP_{top}$ node is calculated. It is then checked if the absolute value of a difference from the azimuth of the destination $\theta_0$ with respect to the departure point intersection STP is equal to or smaller than the value $\theta_c$ (steps 705 and 706). Since the result of the check is in the affirmative, 1 is specified for k (step 713). A total distance from the departure point intersection STP through the intersection A to the intersection $B_{11}$ is calculated to provide a value $Bd_{11}$. Since no value has been stored as a total distance in the intersection network list for the intersection $B_{11}$, the calculated value $Bd_{11}$ is stored together with the intersection sequential number of the $CP_{top}$ node in the intersection network list for the intersection $B_{11}$. The intersection sequential number of the intersection $B_{11}$ is appended to the exploration branch tip buffer (steps 708 to 711). It is then checked if the destination has linked up (step 712). If the destination has not linked up yet, control is returned to step 704. The aforesaid processing is then repeated. Since the absolute value of a difference between the azimuth $\theta$ of an adjacent intersection $B_{12}$ and the value $\theta_0$ is equal to or smaller than the value $\theta_c$, 1 is specified for k. A value $Bd_{12}$ is then calculated as a total distance, and then registered together with the intersection sequential number of the $CP_{top}$ node in the intersection network list for the intersection $B_{12}$ (steps 705, 706, 713, and 708 to 710). The intersection sequential number of the intersection $B_{12}$ is then appended to the exploration branch tip buffer (step 711).

Since the absolute value of a difference between the azimuth $\theta$ of an adjacent intersection $B_{13}$ and the value $\theta_0$ exceeds the value $\theta_c$, 5 is set as a k value. The total distance D to the adjacent intersection is then calculated to provide a value $Bd_{13}$. The total distance $d_1$ from the departure point intersection STP to the intersection $A_2$ has already been stored with a value $Ad_1$ in the intersection network list for the intersection $A_1$ (item (26) in the intersection network list in FIG. 2). The distance $d_2$ between the intersections $A_1$ and $B_{13}$ has already been stored as a distance from the intersection $A_1$ to the adjacent intersection $B_{13}$. A total distance $Bd_{13}$ is therefore calculated according to the expression below.

$$d_1 + kd_2 = Bd_{13}$$

The intersection $B_{13}$ is a duplicate of the departure intersection STP. Zero has already been stored as a total distance in the intersection network list for the departure point intersection STP. Zero is smaller than the value $Bd_{13}$ all the time. The result of the operation at step 715 is therefore in the negative. Neither a total distance nor an intersection sequential number are stored in the intersection network list for the intersection $B_{13}$. The intersection sequential number of the intersection $B_{13}$ is not stored in the exploration branch tip buffer. The total distance in the intersection network list for the intersection regarded as a $CP_{top}$ node will not be updated.

When the intersection $A_1$ regarded as a $CP_{top}$ node has thus been processed (the result of the operation at step 704 is in the negative), an intersection having the shortest total distance is selected from among all the intersections stored in the exploration branch tip buffer except those regarded as $CP_{top}$ nodes. The selected intersection is regarded as new $CP_{top}$ node (step 714) (See the dashed line in FIG. 18(b)). Intersections $A_1$ to $A_4$, $B_{11}$, $B_{12}$, and $B_{14}$ are stored in the exploration branch tip buffer. The intersection $A_1$ is discarded. When the values $Ad_4$, $Ad_3$, and $Bd_{11}$ are large and the value $Ad_2$ is the smallest among those of $Ad_2$, $Bd_{11}$, and $Bd_{12}$, the intersection $A_2$ is regarded as a $CP_{top}$ node.

One of the intersections adjoining the intersection $A_2$, $B_{24}$, is a duplicate of the departure point intersection STP. Neither a total distance nor an intersection sequential number are registered in the intersection network list for the intersection $B_{24}$. The intersection sequential number of the intersection $B_{24}$ is not stored in the exploration branch tip buffer, either (steps 704 to 709, the result of the operation at step 715 is in the negative).

Other intersections $B_{21}$ to $B_{23}$ adjoin the intersection $A_2$ regarded as a $CP_{top}$ node (The result of the operation at the step 704 is in the affirmative). It is then checked if the absolute value of a difference between the azimuth $\theta$ of one of the adjacent intersections, $B_{21}$, and the value $\theta 0$ is equal to or smaller than the value $\theta_c$ (steps 705 and 706). Since the result of the check at step 706 is in the affirmative, 1 is specified for k (step 713). The total distance D from the departure point intersection STP through the intersection $A_2$ to the adjacent intersection B is calculated to provide a value $Bd_{21}$ (step 708). It is then checked if the total distance D' has already been registered in the intersection network list for the intersection $B_{21}$ (step 715). Since the value $Bd_{13}$ has already been stored, it is compared with the calculated value $Bd_{21}$ of the total distance D. If the D value is smaller, the intersection network list for the intersection $B_{13}$ (=$B_{21}$) are updated with the value $Bd_{21}$ and the intersection sequential number of the intersection $A_2$. The intersection sequential number of the intersection $B_{21}$ is appended to the exploration branch tip buffer. However, if the value $Bd_{21}$ is larger, the intersection network list for the intersection $B_{13}$ (=$B_{21}$) is not updated with the $Bd_{21}$ value and the intersection sequential number of the intersection $A_2$. The intersection sequential number of the intersection $B_{21}$ is not appended to the exploration branch tip buffer. Control is then returned to step 704.

As for another adjacent intersection $B_{22}$ among those adjoining $CP_{top}$, since the absolute value of a difference between the values $\theta$ and $\theta_0$ is equal to or smaller than the value $\theta_c$, 1 is set as a k value. A value $Bd_{22}$ is then calculated as a total distance. Since no value has been registered as a total distance in the intersection network list for the intersection $B_{22}$, the value $Bd_{22}$ is stored together with the intersection sequential number of the intersection $A_2$ regarded as a $CP_{top}$ node. The intersection sequential number of the intersection $B_{22}$ is appended to the exploration branch tip buffer. As for an adjacent intersection $B_{23}$, since the absolute value of a difference between the values $\theta$ and $\theta_0$ is equal to or smaller than the value $\theta_c$, 5 is specified for k. A $Bd_{23}$ is then calculated as a total distance. Since no value has been stored as a total distance in the intersection network list for the intersection $B_{23}$, the value $Bd_{23}$ is stored together with the intersection sequential number of the intersection $A_2$ regarded as a $CP_{top}$ node. The intersection $B_{23}$ is appended to the exploration branch tip buffer. The aforesaid processing is repeated.

As a result, if the azimuth of a route leading to a certain adjacent intersection from a $CP_{top}$ node deviates more than the angle $\theta_c$ from the azimuth of a destination relative to a departure point, the exploration priority of the route is lowered. Exploration for the route is then suspended. Exploration is executed first for routes lying around a straight line joining a departure point and a destination. According to heuristic exploration, exploration proceeds to a destination in a narrow range within a predetermined route exploration object zone defined with $BU_{11}$ to $BU_{33}$.

Thereafter, when the tip of an exploration branch reaches the destination, the result of the operation at step 712 is in the affirmative. A minimum value is always specified as a total distance to a $CP_{top}$ node. The destination intersection DSP (m-th intersection), the (m−1)-th intersection specified with the intersection sequential number that is stored together with a total distance in the intersection network list for the intersection DSP (item (25) in the intersection network list in FIG. 2), the (m−2)th intersection stored in the intersection network list for the (m−1)-th intersection, etc., the first intersection stored in the intersection network list for the second intersection, and the zero-order intersection (departure point intersection STP) stored in the intersection network list for the first intersection are linked one after another in the order that starts with the zero-order departure point and ends with the destination. The resultant route is determined as the shortest optimal route. A node array forming the shortest optimal route is stored in the guidance route memory 15J. Route exploration is thus terminated (steps 717 and 718).

Route Exploration (Suburban District)—Dijkstra Technique

When the area determiner 15h determines that an exploration object zone for an optimal route lies in an urban district (step 208 in FIG. 4 or step 701 in FIG. 16), the optimal route explorer 15g first sets a departure intersection STP as the first exploration branch tip node $CP_{top}$. Zero is stored as a total distance in the intersection network list for the departure point intersection STP (step 801 in FIG. 17) (See FIG. 24(a)). The intersection network list for the $CP_{top}$ (=STP) node is referenced to see if any adjacent intersection adjoins the $CP_{top}$ node (step 802). Intersections $A_1$ to $A_4$ are adjoining. The total distance $d_1$ from the departure point intersection STP to the $CP_{top}$ node and the distance $d_2$ from the $CP_{top}$ node to the adjacent intersection $A_4$ are summed up to calculate a value $Ad_4$ as a total distance from the departure point intersection to the adjacent intersection $A_4$, which is represented as the following expression (step 803):

$$d_1 + d_2 = Ad_4$$

The $d_1$ value is stored as a total distance in the intersection network list for the $CP_{top}$ node. Initially, zero is specified because the $CP_{top}$ node and departure point intersection STP are mutually duplicative. The $d_2$ value is stored as a distance to the adjacent intersection $A_4$ in the intersection network list for the $CP_{top}$ node.

It is checked if the total distance D' has been stored in the intersection network list for the intersection $A_4$ (step 804). Since no value has been stored as the total distance D', the above calculated value $Ad_4$ is stored together with an intersection sequential number of a preceding intersection (current $CP_{top}$ node=STP) (step 805) (items (25) and (26) in the intersection network list in FIG. 2). Next, an intersection sequential number of the adjacent intersection $A_4$ is stored in the exploration branch tip buffer in the route exploration memory 15*i* (step 806). It is then checked if the destination has linked up (step 807).

Since the destination has not linked up, control is returned to the step 802. It is then checked if another adjacent intersection adjoins the current $CP_{top}$ node. Intersections $A_1$ to $A_3$ adjoin the $CP_{top}$ node. A value $Ad_1$ is calculated as a total distance from the departure point intersection STP to one of the adjacent intersections, $A_1$. Since no value has been stored as a total distance in the intersection network list for the intersection $A_1$, the value $Ad_1$ is then stored together with an intersection sequential number of a preceding intersection in the intersection network list for the intersection $A_1$. The intersection sequential number of the intersection $A_1$ is then appended to the exploration branch tip buffer (steps 803 to 806). It is then checked if the destination has linked up (step 806). Control is then returned to step 802. The aforesaid processing is repeated for the intersections $A_2$ and $A_3$.

When any other intersection does not adjoin the current $CP_{top}$ node that is a duplicate of the departure point intersection STP (step 802), an intersection having the shortest total distance is selected from all the intersections stored in the exploration branch tip buffer except those regarded as $CP_{top}$ nodes. The selected intersection is regarded as a new $CP_{top}$ node (step 808). The adjacent intersections $A_1$ to $A_4$ reside in the exploration branch tip buffer. If the value $Ad_1$ is the smallest, the intersection $A_1$ is regarded as a $CP_{top}$ node (See the solid line in FIG. 24(*b*)).

The intersection network list for the intersection $A_1$ is referenced to retrieve an adjacent intersection adjoining the intersection $A_1$, $BD_{14}$. The total distance $d_1$ from the departure point intersection STP to the $CP_{top}$ node and the distance $d_2$ from the $CP_{top}$ node to the adjacent intersection $B_{14}$ are summed up to calculate a value $Bd_{14}$ as a total distance from the departure intersection to the adjacent intersection $B_{14}$, which is represented as the expression below (step 803):

$$d_1 + d_2 = Bd_{14}$$

The $d_1$ value is stored as a total distance in the intersection network list for the $CP_{top}$ node. The $d_2$ value is registered as a distance to the adjacent intersection $B_{14}$ in the intersection network list for the $CP_{top}$ node.

It is then checked if any value has been stored as the total distance D' in the intersection network list for the intersection $B_{14}$ (step 804). Since any value has not been stored, the calculated value $Bd_{14}$ is stored together with an intersection sequential number of a preceding intersection (current $CP_{top}$ node=intersection $A_1$) in the intersection network list for the intersection $B_{14}$ (step 805) (items (25) and (26) in the intersection network list in FIG. 2). Next, the intersection sequential number of the adjacent intersection $B_{14}$ is stored in the exploration branch tip buffer (step 806).

It is then checked if the destination has linked up (step 807). If the destination has not linked up yet, control is returned to step 802. It is checked if another adjacent intersection adjoins the current $CP_{top}$ node. Intersections $B_{11}$ to $B_{13}$ are adjoining the $CP_{top}$ node. A value $Bd_{11}$ is calculated as a total distance from the departure point intersection STP through the intersection $A_1$ to one of the intersections, $B_{11}$. Since a value has not been stored as a total distance in the intersection network list for the intersection $B_{11}$, the calculated value $Bd_{11}$ is stored together with an intersection sequential number of a preceding intersection in the intersection network list for the intersection $B_{11}$. The intersection sequential number of the intersection $B_{11}$ is appended to the exploration branch tip buffer (steps 803 to 806). It is then checked if the destination has linked up (step 807). If the destination has not linked up yet, control is returned to step 802. The aforesaid processing is then repeated.

Similarly, a value $Bd_{12}$ is calculated as a total distance to an adjacent intersection $B_{12}$ and then stored together with the intersection sequential number of the intersection $A_1$ in the intersection network list for the intersection $B_{12}$ (steps 803 to 805). The intersection sequential number specifying the intersection $B_{12}$ is appended to the exploration branch tip buffer (step 806).

An adjacent intersection $B_{13}$ is a duplicate of the departure point intersection STP. Zero has already been registered as a total distance in the intersection network list for the departure point intersection $B_{13}$. Neither total distance nor an intersection sequential number is stored in the intersection network list for the intersection $B_{13}$. Nothing is stored in the exploration branch tip buffer (steps 803 and 804)(the result of the operation at the step 809 is in the negative).

When the intersection $A_1$ regarded as a $CP_{top}$ node has been processed, an intersection having the shortest total distance is selected from among all the intersections stored in the exploration branch tip buffer except those regarded as $CP_{top}$ nodes. The selected intersection is regarded as a new $CP_{top}$ node. Specifically, although the intersections $A_1$ to $A_4$, $B_{11}$, $B_{12}$ and $B_{14}$ are stored in the exploration branch tip buffer, the intersection $A_1$ is discarded. If the value $Ad_2$ is the smallest, the intersection $A_2$ is regarded as a $CP_{top}$ node (steps 802 and 808) (See the dashed line in FIG. 24(2)).

A value $Bd_{21}$ is then calculated as the total distance D from the departure point intersection through the intersection $A_2$ regarded as a $CP_{top}$ node to one of the intersections adjoining the intersection $A_2$; that is, the intersection $B_{21}$ (step 803).

The total distance $d_1$ from the departure point intersection STP to the intersection $A_2$ has already been stored with a value $Ad_2$ in the intersection network list for the intersection $A_2$ (item (26) in the intersection network list in FIG. 2). The $d_2$ value has already been stored as a distance from the intersection $A_2$ to the adjacent intersection $B_{21}$. A value $Bd_{21}$ is therefore calculated according to the following expression:

$$d_1 + d_2 = Bd_{21}$$

However, the adjacent intersection $B_{21}$ is a duplicate of the adjacent intersection $B_{12}$. A value $Bd_{12}$ is stored as the total distance D' in the intersection network list for the intersection $B_{12}$. The value $Bd_{12}$ of the total distance D' is compared with the calculated value $Bd_{21}$ of the total distance D. If the D value is smaller, the intersection network list for the intersection $B_{12}$ ($B_{21}$) is updated with the value $Bd_{21}$ and the intersection sequential number of the intersection $A_2$. The intersection sequential number of the intersection $B_{21}$ is appended to the exploration branch tip buffer (steps 804, 809, and 810). However, if the value $Bd_{12}$ is larger, the value $Bd_{21}$ and the intersection sequential number of the intersection $A_2$ are not stored. The intersection sequential number of the intersection $B_{21}$ is not appended to the exploration branch tip buffer. Control is then returned to step 802.

As for an adjacent intersection $B_{22}$ among those adjoining the $CP_{top}$ node, no value has been stored as a total distance in the intersection network list for the intersection $B_{22}$. A value $Bd_{22}$ is stored together with the intersection sequential number of the intersection $A_2$ regarded as the $CP_{top}$. The intersection $B_{22}$ is appended to the exploration branch tip buffer. The same applies to an intersection $B_{23}$. An intersection $B_{24}$ is a duplicate of the departure point intersection. No value is stored as a total distance.

When any other adjacent intersection does not adjoin the intersection $A_2$ regarded as the current $CP_{top}$ node, an intersection having the shortest total distance is selected from among all the intersections stored in the exploration branch tip buffer except those regarded as $CP_{top}$ nodes. The selected intersection is regarded as a new $CP_{top}$ node (steps 802 and 808). The aforesaid processing is repeated.

When the tip of an exploration branch reaches the destination, the result of the operation at the step 807 is in the affirmative. The $CP_{top}$ node has the shortest total distance all the time. The destination intersection DSP (mth intersection), the (m−1)-th intersection specified with an intersection sequential number (item (25) in the intersection sequential list in FIG. 2) stored together with a total distance in the intersection network list for the intersection DSP, the (m−2)-th intersection stored in the intersection network list for the (m−1)-th intersection, etc., the first intersection stored in the intersection network list for the second intersection, the zero-order intersection (departure point intersection STP) stored in the intersection network list for the first intersection are linked one after another in the order that starts with the zero-order departure point intersection and ends with the destination intersection. The resultant route is determined as the shortest optimal route. A node array forming the optimal route is stored in the guidance route memory 15j. Route exploration is then terminated (steps 811 and 812).

According to the Dijkstra technique, the shortest route can be explored more reliably than using the horizontal exploration technique. Furthermore, when the density of roads is high due to being in an urban district, it is checked successively during optimal route exploration if the azimuth of a route leading to a certain adjacent intersection from the tip of an exploration branch deviates by more than the angle $\theta_c$ from the azimuth of a destination relative to a departure point. If the orientation of the route deviates by more than the angle, the distance of the route is weighted to lower the priority of the route. This causes exploration to proceed with the route afterward. Exploration will therefore be executed first for routes lying around a straight line joining the departure point and destination. Owing to the heuristic exploration, an optimal route is explored quickly in an urban district. According to heuristic exploration, exploration is executed first for a narrow range within a predetermined route exploration object zone ($BU_{11}$ to $BU_{33}$). The heuristic exploration technique thus overcomes the drawback of the Dijkstra technique, for which exploration is time-consuming.

In an urban district, the density of roads is high. Heuristic exploration will therefore not fail to find an optimal route leading to a destination.

When an exploration object zone lies in a suburban district, normal non-heuristic Dijkstra exploration is executed. When the density of roads is low and detours alone lead to a destination, since the predetermined route exploration object zone ($BU_{11}$ to $BU_{33}$) is explored meticulously (exhaustively), an optimal route leading to a destination from a departure point can reliably be explored.

At step 707 in FIG. 16, 5 is set as a k value. Aside from 5, 3 or 10 may be specified for k. If k is specified as indefinite, trimming is carried out (when the result of the operation at step 706 is in the negative, control may be returned to step 704 and predetermined trimming may be executed).

Even when the Dijkstra technique is employed, difference coordinates in a difference coordinate system, of which origin is set at an intersection concerned, may be appended to locations of adjacent intersections in the intersection network list for the intersection. At the start of exploration, at step 702, the azimuth of a destination may not be calculated, but it may be deduced in which quadrant a destination resides in terms of a difference coordinate system whose origin is set at a departure point. During exploration, at steps 705 and 706, azimuths may not be compared mutually. Instead of the comparison, it may be determined whether quadrants agree with each other: the intersection network list for an exploration branch tip concerned is referenced to retrieve difference coordinates of an adjacent intersection, it is deduced in which quadrant the adjacent intersection resides in terms of a difference coordinate system whose origin is set at the exploration branch tip, and then it is determined whether the quadrant agrees with the one in which it is determined at step 702 that the destination resides. When the quadrants agree with each other, 1 is set as a k value. When the quadrants disagree with each other, 5 is set as a k value. Thereafter, the processing of the step 708 and later is carried out.

When an adjacent intersection resides in the same quadrant of a difference coordinate system, of which the origin is set at an exploration branch tip, as a destination does, the value 1 may be specified for k. When the adjacent intersection resides in a quadrant next to that in which the destination resides (the second or fourth quadrant when the destination resides in the first quadrant), the value 3 may be specified for k. When the adjacent intersection resides in a quadrant opposed to that in which the destination resides (the third quadrant when the destination resides in the first quadrant), 5 may be specified for k.

Intersection network lists may be placed in advance as part of the road data in map data stored in a CD ROM, so that data of a necessary area can be read together with other road data during route exploration.

Conclusion

According to the present invention, road data is referenced to determine whether an exploration object zone lies in an urban or suburban district. When the exploration object zone lies in an urban district, heuristic exploration is executed: routes deviating from the direction specified with a straight line joining a departure point and a destination are trimmed away or the priorities of such routes are lowered. When an exploration object zone lies in a suburban district, normal non-heuristic exploration (e.g., horizontal or Dijkstra) is executed. When an exploration object zone lies in an urban district (having a high density of roads), heuristic exploration is executed to explore an optimal route in a short period of time. When an exploration object zone lies in a suburban district (having a low density of roads), an optimal route can be explored reliably. Exploration failure does not occur, and it does not take excessive time for route exploration.

Furthermore, road data includes area determination data indicating whether an object area defined by the road data lies in an urban or suburban district. The area determination data is referenced to determine whether an exploration object zone lies in an urban or suburban district. Whether an exploration object zone lies in an urban or suburban district is therefore quickly determined.

This disclosure is illustrated and not limiting; further modifications will be apparent to one skilled in the art, and are intended to fall within the appended claims.

APPENDIX

This Appendix describes in detail the prior art horizontal and Dijkstra exploration techniques.

HORIZONTAL TECHNIQUE

In the horizontal route exploration technique, an intersection network list CRNL is created for each intersection, and placed in a route exploration memory. The intersection network lists are referenced to explore the shortest route linking a departure point and a destination. In the intersection network list CRNL for each intersection (not only for an intersection node but also for a simple node serving as an adjacent node), the following items are registered (stored):

(1) Intersection sequential number (information specifying the intersection).
(2) Drawing number of a map containing the intersection.
(3) Data unit code.
(4) Address in the node table.
(5) Longitude.
(6) Latitude.
(7) Address in the intersection node list (when the intersection is an authentic intersection node).
(8) Number of intersection nodes (when the intersection is an authentic intersection node).
(9) Address in the adjacent node list (when the intersection is an adjacent node).
(10) Number of adjacent nodes (when the intersection is an adjacent node).
(11) Sequential numbers of adjacent intersections.
(12) Distances to adjacent intersections.
(13) Sequential number of an intersection preceding the intersection.
(14) Total distance from a departure point to the intersection.
(15) Retrieval degree of the intersection. Herein, items (1) to (6) provide intersection ID. However, items (13) to (15) are registered when route exploration is executed.

Figure 22:
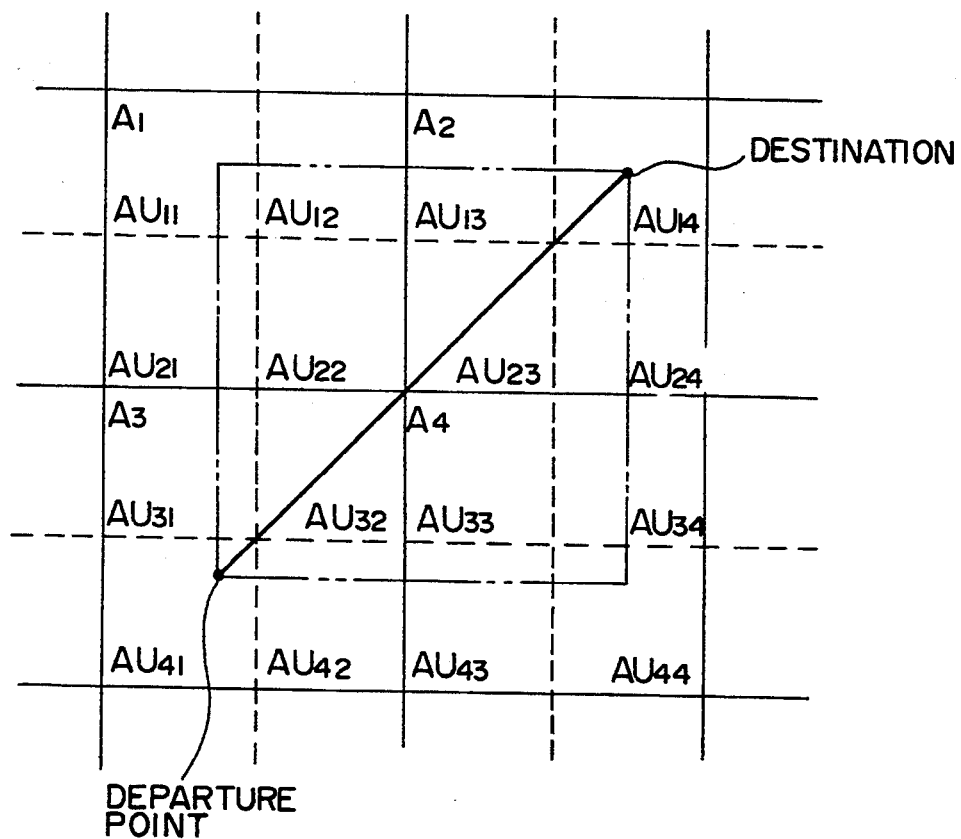
FIG. 22 shows a drawing used to create intersection network lists.

For creating the intersection network list CRNL, as shown in FIG. 22, drawing management information included in map data is referenced to retrieve a drawing number for each drawing covering a square area whose diagonal is a straight line joining a departure point and a destination. The map data is used to input road data for each of the quarter drawings ($AU_{11}$ to $AU_{44}$ in FIG. 22) covering the square area whose diagonal is a straight line joining a departure point and a destination (each quarter drawing is specified with a drawing number and a data unit code). The node table NDTB is referenced to retrieve nodes, for each of which an intersection ID flag or an adjacent node ID flag is set. An intersection network list bearing an intersection sequential number (1) is placed in the route exploration memory. Intersection ID ((2) to (6)) is then registered in the intersection network list. The node table, intersection node list, and adjacent node list are referenced to fetch an address in the intersection node list, the number of intersection nodes, an address in the adjacent node list, and the number of adjacent nodes. Thus, the fetched data are registered as items (7) to (10) in the intersection network list.

Next, the node table NDTB is referenced to calculate the length of each link between adjoining intersections (one of which may be a simple node serving as an adjacent node) for each of the roads in the road list RDLT. In the intersection network list concerning one intersection of each link, the other intersection of the link is registered as an adjacent intersection. The intersection sequential number (adjacent intersection sequential number), which is registered in the intersection network list concerning the adjacent intersection, and the distance of the link are also registered in the intersection network list ((11) and (12)).

The intersection network list may be created for an intersection node serving as an adjacent node or for a simple node serving as an adjacent node. In either case, another intersection network list may be created for the same adjacent node in another sharing unit. The adjacent node list NNLT is therefore referenced to retrieve intersection sequential numbers specified in the other sharing units. The retrieved intersection sequential numbers are registered as adjacent intersection sequential numbers and zero is registered as their distances in the intersection network list. Adjacent node linkage is then executed.

When the intersection network lists CRNL have thus been created, an optimal route is explored using departure point data and destination data according to a horizontal exploration technique.

FIG. 23 is a schematic explanatory diagram showing the horizontal exploration technique. Roads are graphed as straight lines, and intersections (including simple nodes serving as adjacent nodes) are graphed as points of intersection at which lines intersect. The distances between each pair of intersections are known. STP means a departure point (intersection), and DSP means a destination (intersection).

The departure point is regarded as a zero-order intersection (the degree 0 is registered as item (15) in the intersection network list). First intersections $A_1$ to $A_4$ adjoining the zero-order intersection along roads are retrieved by referencing the intersection network list CRNL. A total distance from the departure point by way of a preceding intersection (intersection of the next lower degree, in this example, the departure intersection) is calculated for each of the first intersections $A_1$ to $A_4$. In one-to-one correspondence with the intersections $A_1$ to $A_4$, the calculated total distances are registered together with an intersection sequential number specifying the preceding intersection and a retrieval degree 1 in the intersection network list (items (13) to (15) in the intersection network list). Next, second intersections $B_{ij}$ are retrieved for each of the first intersections $A_1$ to $A_4$. Total distances to the second intersections by way of the associated preceding first intersections are calculated, and then registered together with an intersection sequential number of the preceding intersection and a retrieval degree 2 in one-to-one correspondence with the intersections $B_{ij}$ in the intersection network list.

For example, three second intersections $B_{11}$, $B_{12}$, and $B_{13}$ are retrieved for the first intersection $A_1$. In one-to-one correspondence to the second intersections, the following total distances are registered together with the intersection sequential number of the associated intersection $A_1$:

$B_{11}$: total distance $Bd_{11}$ from the departure point via the first intersection $A_1$.

$B_{12}$: total distance $Bd_{12}$ from the departure point via the first intersection $A_1$.

$B_{13}$: total distance $Bd_{13}$ from the departure point via the first intersection $A_1$. For the first intersection $A_2$, three second intersections $B_{21}$, $B_{22}$, and $B_{23}$ are retrieved. In one-to-one correspondence with the second intersections, the following total distances are registered together with the intersection sequential number of the associated intersection $A_1$.

$B_{21}$: total distance $Bd_{21}$ from the departure point via the first intersection $A_2$.

$B_{22}$: total distance $Bd_{22}$ from the departure point via the first intersection $A_1$.

$B_{23}$: total distance $Bd_{23}$ from the departure point via the first intersection $A_1$.

The same applies to the other first intersections $A_3$ and $A_4$. That is to say, second intersections adjoining the first intersections are retrieved and specified data are registered. Herein, the intersections $B_{13}$ and $B_{21}$ are mutually duplicative. When an intersection for which data should be stored is a duplicate of another one, if a total distance of a different route has already been stored for the intersection, (a) the total distance $Bd_{13}$ is compared with (b) the total distance $Bd_{21}$. The smaller distance is adopted and stored.

For example, if the $Bd_{13}$ value is larger than the $Bd_{21}$ value, the total distance $Bd_{21}$ and the sequential number of the associated preceding intersection $A_2$ are registered in the intersection network list for the intersection $B_{13}$ (=$B_{21}$)

The third intersections $C_{ij}$ adjoining the second intersections $B_{ij}$ are retrieved as mentioned above. The total distances from the departure point to the intersections $C_{ij}$ by way of the associated preceding intersections are calculated and stored together with the preceding intersection sequential numbers. In general, the (i+1)-th intersections are retrieved for the i-th intersections by referencing the intersection network lists. The total distances from the departure point to the (i+1)-th intersections via the preceding i-th intersections are calculated, and registered together with the intersection sequential numbers of the preceding intersections in the intersection network lists for the (i+1)-th intersections. Finally, the destination (intersection) DSP links up.

When the destination links up, the (m−1)-th intersection registered in the intersection network list for the destination (m-th intersection), the (m−2)-th intersection registered in the intersection network list for the (m−1)-th intersection, etc., the first intersection stored in the intersection network list for the second intersection, and the zero-order intersection (departure point) registered in the intersection network list for the first intersection are linked one after another in the order that starts with the departure point and ends with the destination. The resultant route is regarded as the shortest optimal route.

When a destination has linked up with a certain route, as long as another route has a total distance that is shorter than the total distance registered in the intersection network list for the destination, route exploration may continue. When the destination has linked up with another route, if the total distance of the route is shorter than that registered in the intersection network list for the destination, the total distance registered in the intersection network list is updated. Thereafter, when the total distances of all the other routes come to be shorter than the one registered in the intersection network list for the destination, route exploration may be terminated.

The intersection network lists CRNL are, as mentioned above, created using road data, which does not contain any intersection network list and is stored in a CD ROM (compact disc read only memory), within the on-vehicle navigator. The intersection network lists CRNL may be prepared as part of the road data, which is duly combined with the intersection network lists and expanded, or may be stored as part of the road data (road layers) in the CD ROM. Furthermore, route exploration may proceed to a departure point intersection with a destination intersection as a start point, which also provide an optimal guidance route.

According to the horizontal exploration technique, an optimal route (meaning the shortest distance) can be explored on the basis of graphology. The optimal guidance route is then displayed in a specific highlighting color together with a vehicle location mark within a map image on the screen, whereby route guidance is given to the driver in terms of his/her desired destination.

DIJKSTRA TECHNIQUE

Figure 24A:
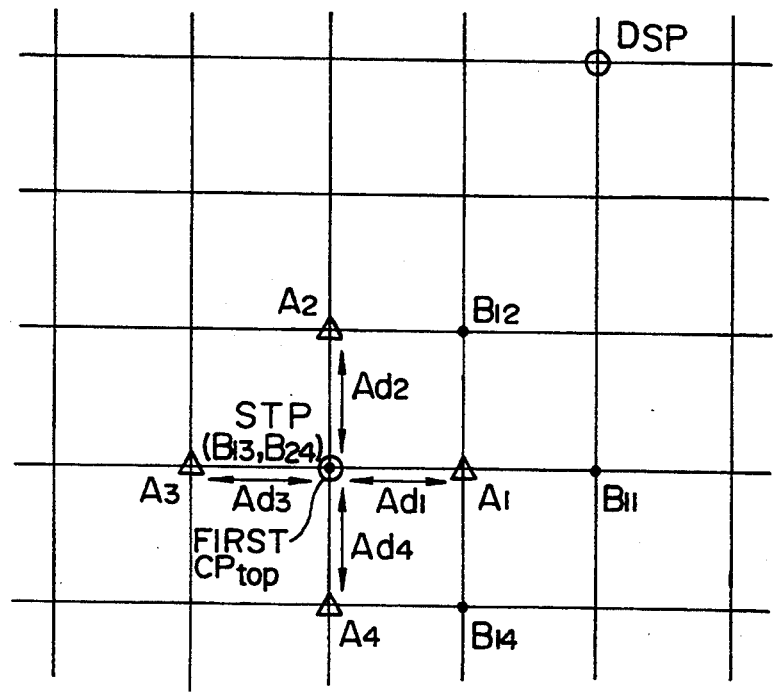
FIGS. 24a, 24b show a route exploration method based on the Dijkstra technique.
Figure 24B:
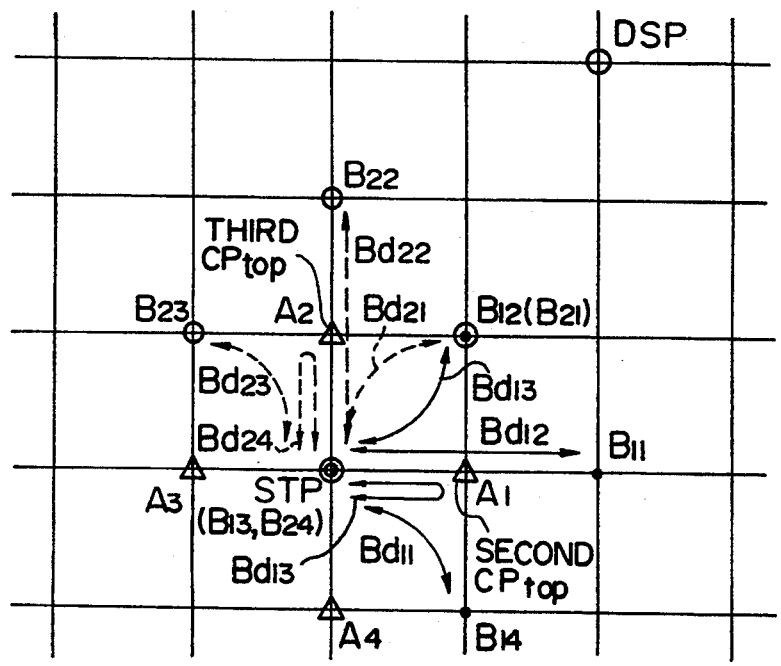
Figure 25:
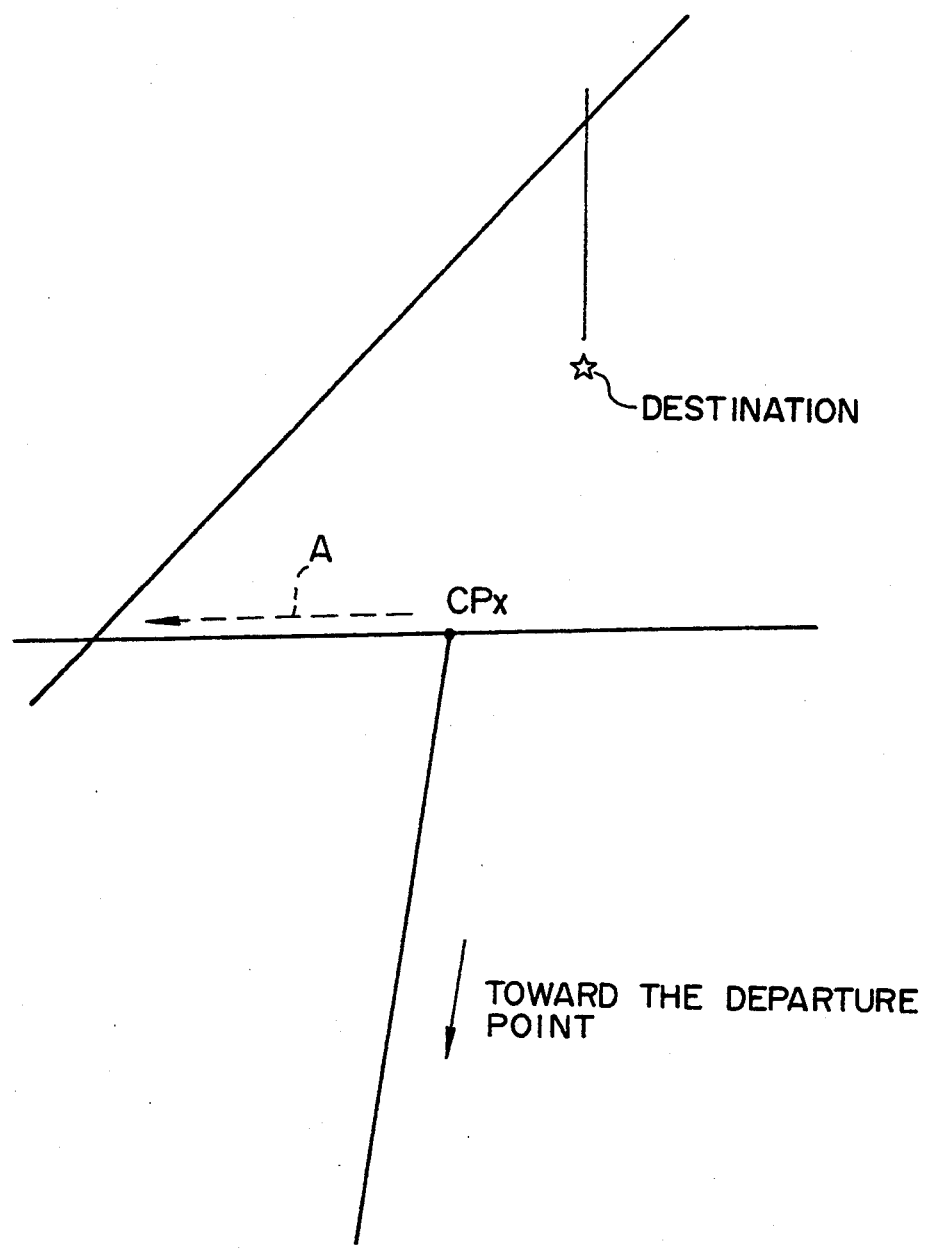
FIG. 25 shows a deficiency of conventional heuristic exploration.

The Dijkstra technique is also known for route exploration. The Dijkstra technique also employs intersection network lists, wherein retrieval degrees need not be registered. FIGS. 24a, 24b are schematic diagrams of the Dijkstra technique.

In the Dijkstra technique, intersection network lists CRNL are referenced. First, zero is registered as a total distance in the intersection network list concerning a departure point intersection STP. The departure point intersection STP is regarded as the first exploration branch tip node $CP_{top}$. A total distance $Ad_1$ from the departure point intersection STP to one of the intersections adjoining the $CP_{top}$ node, $A_1$, is calculated and registered together with an intersection sequential number of a preceding intersection (current $CP_{top}$) (items (13) and (14) in the intersection network list). Next, an intersection sequential number of the adjacent intersection $A_1$ is registered in an exploration branch tip buffer. As for the other intersections $A_2$ to $A_4$ adjoining the $CP_{top}$ node, total distances $Ad_1$ to $Ad_4$ from the departure point intersection STP are calculated and registered together with an intersection sequential number of a preceding intersection in the intersection network lists for the intersections. The intersection sequential numbers of the intersections $A_2$ to $A_4$ are then appended to the exploration branch tip buffer (See FIG. 24(a)).

Next, an intersection having the shortest total distance is selected from among all the intersections registered in the exploration branch tip buffer, except those regarded as $CP_{top}$ nodes. The intersection is then regarded as a new $CP_{top}$ node. The intersections $A_1$ to $A_4$ are registered in the exploration branch tip buffer. If the value $Ad_1$ is the smallest among the values $Ad_1$ to $Ad_4$, the intersection $A_1$ is regarded as the $CP_{top}$ node (see the solid line in FIG. 24(b)). A total distance $Bd_{11}$ from the departure point STP through the intersection $A_1$ to the intersection $B_{11}$, which is one of adjacent intersections adjoining $A_1$, is then calculated. The total distance between the intersections STP and $A_1$ has already been registered as a total distance $Ad_1$ in the intersection network list for the intersection $A_1$. The distance between the intersections $A_1$ and $B_{11}$ has been registered as a distance from the intersection $A_1$ to an adjacent intersection $B_{11}$ in the intersection network list for the intersection $A_1$. The value $Bd_{11}$ is therefore calculated as the sum of the values of the above distances. The $Bd_{11}$ value is then registered as a total distance together with an intersection sequential number of the intersection A that is regarded as a $CP_{top}$ node. An intersection sequential number of the intersection $B_{11}$ is then appended to the exploration branch tip buffer.

As for the other intersections $B_{12}$ and $B_{14}$ adjoining the intersection $A_1$, the total distances and the intersection sequential number of the intersection $A_1$ are registered in the intersection network lists for the intersections. The intersection sequential numbers of $B_{12}$ and $B_{14}$ are also stored in the exploration branch tip buffer.

An intersection $B_{13}$ adjoining the intersection $A_1$ is a duplicate of the departure point intersection STP. Zero has already been registered as a total distance in the intersection network list for the departure point intersection STP. The value of zero is always smaller than the $Bd_{13}$ value that is a double of the distance between the intersections STP and $A_1$. Neither a total distance nor an intersection sequential number are therefore registered in the intersection network list for the intersection $B_{13}$. Nothing is true is registered in the exploration branch tip buffer.

When the present $CP_{top}$ node has thus been processed, an intersection having the shortest total distance is selected from among the intersections registered in the exploration branch tip buffer except those regarded as $CP_{top}$ nodes. The intersection is then regarded as a new $CP_{top}$ node. The intersections $A_1$ to $A_4$, and $B_{11}$, $B_{12}$, and $B_{14}$ are registered in the exploration branch tip buffer, while the intersection $A_1$ is discarded. If the $Ad_2$ value is the smallest among the values of $Ad_2$ to $Ad_4$ and $Bd_{11}$, $Bd_{12}$, and $Bd_{14}$, the intersection $A_2$ is regarded as a $CP_{top}$ node (see the dashed line in FIG. 24(b)). A total distance $Bd_{22}$ from the departure point intersection STP through the intersection $A_2$ to the intersection $B_{22}$, which is one of the adjacent intersections adjoining the intersection $A_2$, is then calculated and registered together with an intersection sequential number specifying the intersection $A_2$, which is regarded as a $CP_{top}$ node, in the intersection network list for the adjacent intersection $B_{22}$. The intersection sequential number of the intersection $B_{22}$ is then stored in the exploration branch tip buffer.

As for the other intersection $B_{23}$ adjoining the intersection $A_2$, a total distance from the departure point intersection STP through the intersection $A_2$ is registered together with an intersection sequential number of the intersection $A_2$. An intersection sequential number of the intersection $B_{23}$ is also stored in the exploration branch tip buffer.

An intersection $B_{24}$ is a duplicate of the departure point intersection STP. Zero has been registered as a total distance in the intersection network list for the departure point intersection STP. The total distance is always smaller than the total distance $Bd_{24}$ that is double the distance between the intersections STP and $A_2$. Neither a total distance nor an intersection sequential number will be registered in the intersection network list for the intersection $B_{24}$. Nothing is stored in the exploration branch tip buffer.

An adjacent intersection $B_{21}$ is a duplicate of an adjacent intersection $B_{12}$. A total distance $Bd_{12}$ has already been registered in the intersection network list for the intersection $B_{12}$. When an attempt is made to register a total distance $Bd_{21}$ from the intersection STP through the intersection $A_2$ to the intersection $B_{21}$, the $Bd_{21}$ value is compared with the $Bd_{12}$ value. Only when the $Bd_{21}$ value is smaller, the intersection network list for the intersection $B_{12}$ (=$B_{21}$) is updated with the total distance $Bd_{21}$ and an intersection sequential number of the intersection $B_{21}$. The intersection sequential number of the intersection $B_{21}$ is appended to the exploration branch tip buffer. If the $Bd_{21}$ value is larger, the $Bd_{21}$ value and an intersection sequential number of the intersection $B_{21}$ will not be registered for update. The intersection $B_{21}$ will not be appended to the exploration branch tip buffer.

The foregoing processing is repeated. A total distance to a certain adjacent intersection adjoining a $CP_{top}$ node and an intersection sequential number of the $CP_{top}$ node are registered, and an intersection sequential number of the adjacent intersection is appended to the exploration branch tip buffer. Thereafter, when an adjacent intersection agrees with a destination intersection DSP, exploration is terminated.

An intersection having the shortest total distance is regarded as a $CP_{top}$ node all the time. A destination intersection DSP (m-th intersection), the (m−1)-th intersection registered together with a total distance in the intersection network list for the destination intersection, the (m−2)-th intersection registered together with a total distance in the intersection network list for the (m−1)-th intersection, etc., the first intersection registered in the intersection network list for the second intersection, and the zero-order intersection (departure point intersection STP) registered in the intersection network list for the first intersection are linked one after another in the order that starts with the zero-order intersection and ends with the destination. This results in the shortest optimal route.

What is claimed is:

1. A route exploration method for exploring an optimal route that links a departure point and a destination, comprising the steps of:
   determining a characteristic of an exploration object zone;
   selecting one of at least two exploration techniques depending on the determined characteristic; and
   identifying the optimal route between the departure point and the destination using the selected one of said at least two exploration techniques.

2. A route exploration method according to claim 1, wherein the characteristic is a road density of said exploration object zone.

3. A route exploration method in which road data including intersection network lists is referenced to explore an optimal route linking a departure point and a destination, comprising the steps of:

referencing said road data to determine a road density of an exploration object zone;

when said exploration object zone lies in a high road density district, executing a heuristic exploration whereby routes deviating from the direction specified with a straight line joining the departure point and destination are trimmed away or the priorities of such routes are lowered; and when said exploration object zone lies in a low road density district, executing a non-heuristic exploration.

4. A route exploration method according to claim 3, wherein area determination data, which indicates whether an object area defined by road data lies in a high or low road density district, is included in said road data, and said area determination data is referenced to determine whether an exploration object zone lies in a high or low road density district.

5. A route exploration method according to claim 3, wherein intersection network lists are pre-stored in map data units in a memory, whereby a necessary intersection network list can be read from said memory.

6. A route exploration method according to claim 3, wherein said non-heuristic exploration includes a Dijkstra exploration.

7. A route exploration method according to claim 3, wherein said non-heuristic exploration includes a horizontal exploration.

8. A route exploration method according to claim 3, wherein the density of roads is determined by dividing the total number of intersections, corresponding to the total number of intersection network lists, by the size of an object area for which the intersection network lists are stored, and comparing with a predetermined reference value, wherein when the density is larger than the reference value, a high road density district is identified, and wherein when the density is smaller than the reference value, a low road density district is identified.

9. A route exploration method according to claim 8, wherein the road data includes a node table comprising a number of nodes, each node having an associated intersection identification flag which, when set, identifies an intersection, and wherein the total number of intersections is determined by counting the number of nodes having intersection identification flags which are set.

10. A route exploration method according to claim 8, wherein the number of intersections defined by intersection node lists is counted to determine the total number of intersections.

11. A route exploration method according to claim 8, wherein the total number of intersections is estimated in terms of a capacity of a route exploration memory occupied by intersection network lists stored therein.

12. A route exploration method according to claim 8, wherein the total number of intersections is estimated in terms of the sum of the sizes of intersection node lists included in road data.

13. A route exploration method according to claim 3, wherein said step of executing heuristic exploration comprises:

checking successively during optimal route exploration if the azimuth of a route leading to a certain adjacent intersection from the i-th intersection (i=1, 2, etc., and n) deviates by more than a specified angle from the azimuth of a destination relative to a departure point; and when the azimuth deviates by more than the specified angle, trimming away the route, whereby exploration will not proceed with the route any longer.

14. A route exploration method according to claim 13, further comprising the step of determining said azimuth of a route leading to a certain adjacent intersection from the i-th intersection by reading the latitudinal and longitudinal coordinates of the i-th intersection and the intersection adjoining the ith intersection from an intersection network list.

15. A route exploration method according to claim 3, wherein said step of heuristic exploration comprises:

checking successively during optimal route exploration if a total distance of a route leading to an adjacent intersection of the i-th intersection (i=1, 2, etc., and n) from a departure point intersection exceeds a specified distance; and when the total distance exceeds the specified distance, stopping exploration of the route.

16. A route exploration method according to claim 15, wherein said total distance is a sum of a distance $d_1$ from the departure point intersection to the ith intersection and a distance $d_2$ from the i-th intersection to the adjacent intersection.

17. A route exploration method according to claim 3, wherein said step of heuristic exploration comprises:

storing difference coordinates of adjacent intersections in a difference coordinate system, of which an origin is set at an object intersection, in the intersection network list;

determining at the start of retrieval in which quadrant a destination intersection resides in terms of a difference coordinate system whose origin is set at a departure point intersection;

referencing the intersection network list for the i-th intersection to retrieve difference coordinates registered for each adjacent intersection;

determining whether the quadrant, in which the adjacent intersection resides, agrees with the quadrant in which the destination resides; and determining on the basis of the result of the determination whether a route linking the i-th intersection and the adjacent intersection adjoining the i-th intersection is to be trimmed away.

18. A route exploration method according to claim 3, wherein said step of heuristic exploration comprises:

checking successively during optimal route exploration if the azimuth of a route leading to a certain adjacent intersection from the tip of an exploration branch is deviating by a specified angle from the azimuth of a destination relative to a departure point; and when the azimuth is deviating by more than the specified angle, weighting the distance of the route to lower the priority of the route.

19. A route exploration method for a navigation apparatus including a vehicle location detector and a guidance route memory from which road data including intersection network lists is referenced to explore an optimal route linking a departure point and a destination, comprising the steps of:

reading a road data portion from the guidance route memory;

calculating a density of intersections in the road data portion by dividing the total number of intersections corresponding to the total number of intersection network lists by the size of an object area for which intersection network lists are created, and then comparing with a certain reference value;

when the calculated density exceeds said reference value, determining that an exploration object zone lies in an urban district;

when the calculated density is less than said reference value, determining that an exploration object zone lies in a suburban district;

when the determination is that the exploration object zone lies in an urban district, reading the latitudinal and longitudinal coordinates of the i-th intersection (i=1, 2, etc., and n) and a certain intersection adjoining the i-th intersection from an intersection network list and a vehicle location from the vehicle location detector, and calculating an azimuth of a route leading from the vehicle location to the adjacent intersection from the i-th intersection;

checking if said azimuth is deviating by more than a specified angle from the azimuth of the destination relative to the departure;

when said azimuth is deviating by more than the specified angle, trimming away the route whereby exploration will not proceed with the route any longer; and when said exploration object zone lies in a suburban district, executing non-heuristic exploration.

20. A vehicular navigation apparatus having a memory that stores map data including road data, a vehicle location detector for detecting a current location of a vehicle, a guidance route memory that stores guidance route data concerning routes leading to a desired destination, and a map display controller that uses map data stored in said map data memory and guidance route data stored in said guidance route memory to display a map image, which shows a location of the vehicle and its surrounding areas, together with a vehicle location mark and a guidance route as a route guidance screen, and comprising:

an operation unit designating route guidance that provides a desired route leading to the destination; and an area determiner that when said operation unit is used to designate route guidance, references road data to determine whether an exploration object zone lies in an high or low density district; wherein:

when said area determiner determines that said exploration object zone lies in a high road density district, a heuristic exploration trims away routes deviating from the direction specified with a straight line joining the departure point and destination or the priorities of such routes are lowered; and when said exploration object zone lies in a low road density district, a non-heuristic exploration is executed.

* * * * *